United States Patent
Ben Attouch et al.

(10) Patent No.: US 11,958,353 B2
(45) Date of Patent: Apr. 16, 2024

(54) CONTROLLABLE DIFFERENTIAL SYSTEM AND VEHICLE HAVING THE CONTROLLABLE DIFFERENTIAL SYSTEM

(71) Applicant: BOMBARDIER RECREATIONAL PRODUCTS INC., Valcourt (CA)

(72) Inventors: Walid Ben Attouch, Sherbrooke (CA); Francois-Charles Dumas, Saint-Denis-de-Brompton (CA); Patrick Leroux, Granby (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 17/772,764

(22) PCT Filed: Oct. 30, 2020

(86) PCT No.: PCT/IB2020/060215
§ 371 (c)(1),
(2) Date: Apr. 28, 2022

(87) PCT Pub. No.: WO2021/084497
PCT Pub. Date: May 6, 2021

(65) Prior Publication Data
US 2022/0379721 A1    Dec. 1, 2022

Related U.S. Application Data

(60) Provisional application No. 62/928,793, filed on Oct. 31, 2019.

(51) Int. Cl.
*B60K 23/04*    (2006.01)
*B60K 17/35*    (2006.01)
(Continued)

(52) U.S. Cl.
CPC .............. *B60K 17/35* (2013.01); *B60K 23/04* (2013.01); *F16H 48/34* (2013.01);
(Continued)

(58) Field of Classification Search
CPC .. B60K 17/35; B60K 23/04; B60K 2023/046; B60K 17/34; F16H 48/34; F16H 2048/204; B60Y 2200/124; B60Y 2400/405
See application file for complete search history.

(56) References Cited

U.S. PATENT DOCUMENTS 5,398,565 A * 3/1995 Brock .................... F16H 63/16
74/900
7,600,599 B1  10/2009 Dahl et al.
(Continued)

FOREIGN PATENT DOCUMENTS

JP  2012200154 A  * 10/2012

OTHER PUBLICATIONS

International Search Report of PCT/IB2020/060215; Lee Young; dated May 24, 2021.

*Primary Examiner* — Justin Holmes
(74) *Attorney, Agent, or Firm* — BCF LLP

(57) ABSTRACT

A controllable differential system for a vehicle includes a differential that may be disengaged or engaged, and may further be locked when engaged. A differential lock switch has three positions for sending commands to an actuator for disengaging or engaging the differential and for sending commands to a controller for unlocking and locking the differential. The vehicle includes a motor, a transmission continuously connected to a rear drivetrain, and the differential mounted in a front drivetrain. The vehicle may be driven in rear-wheel drive mode when the differential is disengaged or in four-wheel drive mode when the differen- (Continued)

tial is engaged. The vehicle may enforce a vehicle speed limitation or an engine speed limitation when the differential is locked while a manual override control is not activated. The vehicle may implement an anti-lock braking system that may be disabled when the differential is locked.

19 Claims, 14 Drawing Sheets

(51) Int. Cl.
  *F16H 48/34*    (2012.01)
  *F16H 48/20*    (2012.01)

(52) U.S. Cl.
  CPC ... *B60K 2023/046* (2013.01); *B60Y 2200/124* (2013.01); *B60Y 2400/405* (2013.01); *F16H 2048/204* (2013.01)

(56) References Cited

U.S. PATENT DOCUMENTS

| | | |
|---|---|---|
| 8,678,976 B1 | 3/2014 | Wilson et al. |
| 8,790,217 B1 | 7/2014 | Bowers et al. |
| 9,358,882 B2 | 6/2016 | Hapka |
| 9,453,570 B2 * | 9/2016 | Martin, III ............. F16H 48/30 |
| 2013/0167681 A1 * | 7/2013 | Kii ....................... B60K 23/08 |
| | | 74/473.12 |

* cited by examiner

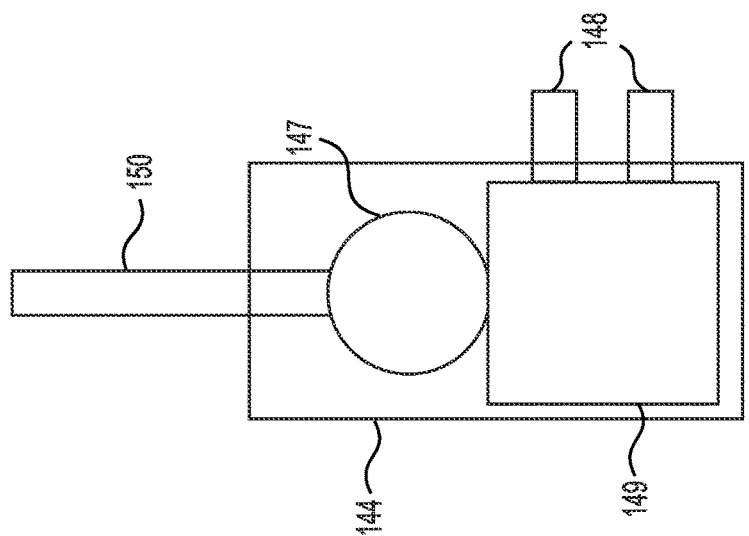
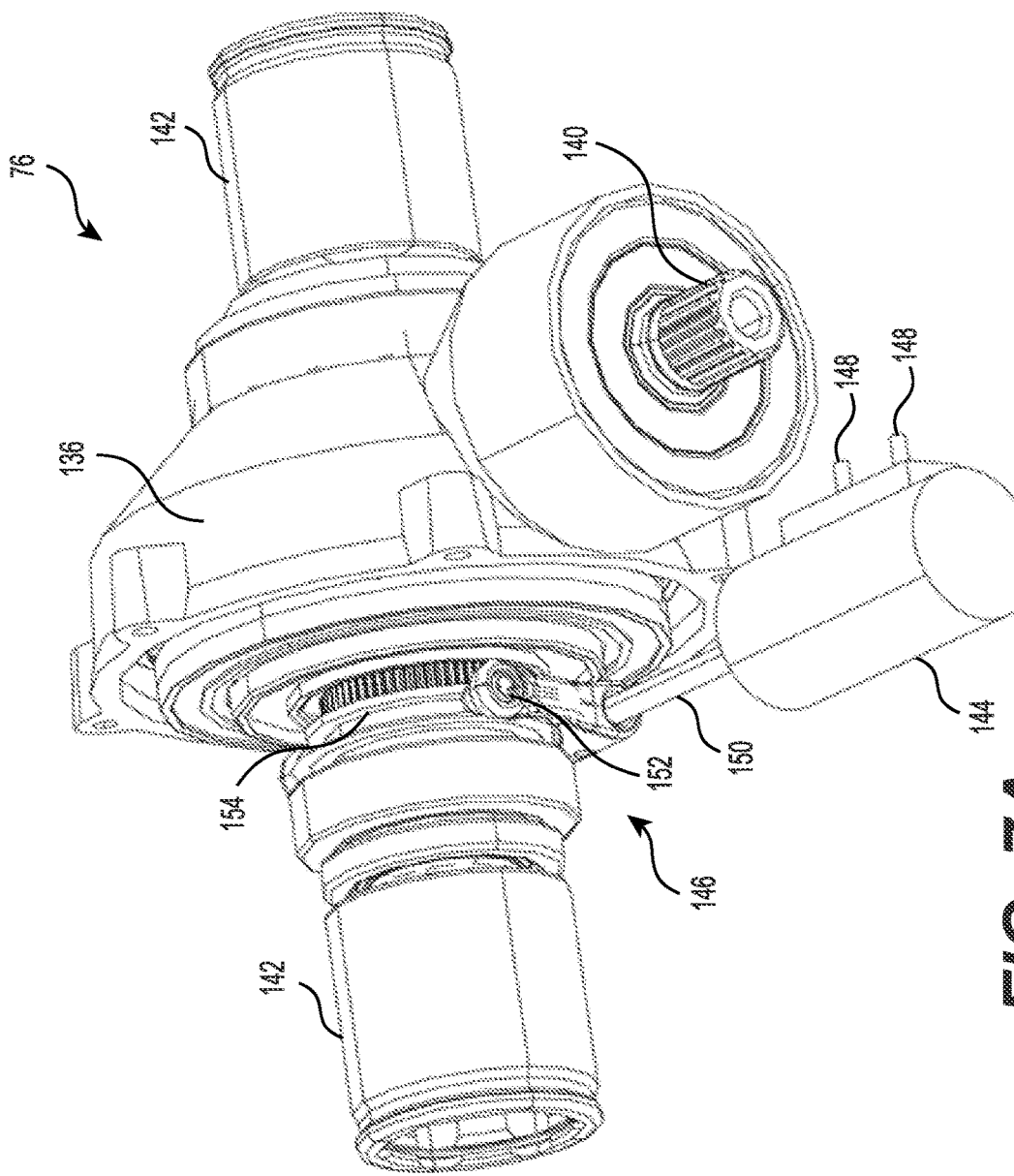
FIG. 7A
FIG. 7B

CONTROLLABLE DIFFERENTIAL SYSTEM AND VEHICLE HAVING THE CONTROLLABLE DIFFERENTIAL SYSTEM

CROSS-REFERENCE

The present application claims priority from U.S. Provisional Application Ser. No. 62/928,793, filed on Oct. 31, 2019, the entirety of which is incorporated by reference herein.

TECHNOLOGICAL FIELD

The present technology relates to a controllable differential system and to a vehicle having the controllable differential system.

BACKGROUND

All-terrain vehicles (ATVs), side-by-side vehicles (SSVs) and similar vehicles are used for utility and recreational purposes. Such ATVs and SSVs are oftentimes provided with a transmission that can direct power from an internal combustion engine (ICE) to a rear drivetrain, for rear-wheel drive (or two-wheel drive) operation, or to both the rear drivetrain and a front drivetrain, for all-wheel drive (or four-wheel drive) operation.

Some driving conditions, particularly when the vehicle is being driven off-road, may cause wheel slip, even when in all-wheel drive mode. Locking differentials may be mounted in either or both of the front and/or rear drivetrain. Conventional controls for locking and unlocking differentials are cumbersome. Some controls require stopping vehicles in order to lock or unlock their differentials.

Thus, there is a desire for a controllable differential system and for a vehicle that addresses the aforementioned drawbacks.

SUMMARY

It is an object of the present technology to ameliorate at least some of the inconveniences present in the prior art.

According to an aspect of the present technology, there is provided a controllable differential system for a vehicle, comprising: a differential having: a disengaged mode, and an engaged mode, the differential being selectively lockable while in the engaged mode; a differential lock switch having: a first position, a second position, and a third position, the second position being intermediate the first and third positions, the differential lock switch being biased to return to the second position when released from the third position, the differential lock switch being operatively connected to the differential for causing the differential to be: in the disengaged mode when the differential lock switch is in the first position, and in the engaged mode when the differential lock switch is in the second position; and a controller operatively connected to the differential and to the differential lock switch, the controller being adapted for controlling the differential to: selectively change the differential from one of an unlocked state and a locked state to another one of the unlocked state and the locked state when the differential lock switch is placed in the third position.

In some implementations of the present technology, the controller is further adapted for controlling the differential to change from the one of the unlocked state and the locked state to the other one of the unlocked state and the locked state while the differential lock switch is being held in the third position for more than a predetermined time.

In some implementations of the present technology, the controller is further adapted for controlling the differential to change from the one of the unlocked state and the locked state to the other one of the unlocked state and the locked state when the differential lock switch is released from the third position after being held for more than a predetermined time.

In some implementations of the present technology, the controllable differential system further comprises an actuator electrically connected to the differential lock switch and adapted to receive therefrom commands to engage and disengage the differential, the actuator being further electrically connected to the controller and adapted for receiving therefrom commands to lock and unlock the differential; and a mechanical lock adapted for being driven by the actuator to selectively engage and disengage the differential and to selectively lock and unlock the differential.

In some implementations of the present technology, the actuator comprises an electric motor driven by an integrated circuit; and the mechanical lock comprises a rod driven by the electric motor and a lever driven by the rod, the lever being adapted to engage a sleeve in the differential to selectively disengage, engage or engage and lock the differential.

In some implementations of the present technology, the actuator is adapted for providing an electronic feedback signal of the locked or unlocked state to the controller.

In some implementations of the present technology, the differential is a front differential adapted for being mounted in a front drivetrain of the vehicle.

According to another aspect of the present technology, there is provided a vehicle, comprising: a frame; a motor connected to the frame; a rear drivetrain connected to the frame; a front drivetrain connected to the frame, the front drivetrain comprising: a controllable differential system, comprising: a differential having: a disengaged mode, and an engaged mode, the differential being selectively lockable while in the engaged mode; a differential lock switch having: a first position, a second position, and a third position, the second position being intermediate the first and third positions, the differential lock switch being biased to return to the second position when released from the third position, the differential lock switch being operatively connected to the differential for causing the differential to be: in the disengaged mode when the differential lock switch is in the first position, and in the engaged mode when the differential lock switch is in the second position; and a controller operatively connected to the differential and to the differential lock switch, the controller being adapted for controlling the differential to: selectively change the differential from one of an unlocked state and a locked state to another one of the unlocked state and the locked state when the differential lock switch is placed in the third position; and a transmission adapted for directing power from the motor to the rear drivetrain and, when the differential in in the engaged mode, to direct power from the motor to the front drivetrain.

According to a further aspect of the present technology, there is provided a vehicle, comprising: a frame; a motor connected to the frame; a rear drivetrain connected to the frame; a front drivetrain connected to the frame, the front drivetrain comprising a front differential selectably configurable in one of (i) a disengaged mode for rear-wheel drive operation of the vehicle, (ii) an engaged and unlocked mode, and (iii) an engaged and locked mode, the vehicle being operable in all-wheel drive when the front differential is engaged; a transmission adapted for: directing power from the motor to the rear drivetrain, and when the front differential is engaged, directing power from the motor to the front drivetrain; a controller operatively connected to the front differential; and a differential lock switch operatively connected to the front differential and to the controller, the differential lock switch being adapted for: providing a disengaging command to the front differential for placing the front differential in the disengaged mode, providing an engaging command to the front differential for placing the front differential in the engaged and unlocked mode, providing a locking command to the controller, the controller selectively causing the front differential to change from the engaged and unlocked mode to the engaged and locked mode when receiving the locking command, and providing an unlocking command to the controller, the controller causing the front differential to change from the engaged and locked mode to the engaged and unlocked mode when receiving the unlocking command.

In some implementations of the present technology, the vehicle further comprises an actuator operatively connected to the front differential and controlled by the controller, the actuator being adapted for: receiving the disengaging command from the differential lock switch; receiving the engaging command from the differential lock switch; receiving the locking command via the controller; receiving the unlocking command via the controller; and in response to receiving one of the disengaging command, the engaging command, the locking command and the unlocking command, selectively placing the front differential in a corresponding one of the disengaged mode, the engaged and unlocked mode and the engaged and locked mode.

In some implementations of the present technology, the differential lock switch has: a first position, a second position, and a third position, the second position being intermediate the first and third positions, the differential lock switch being biased to return to the second position when released from the third position; and the differential lock switch is adapted for: providing the disengaging command when in the first position, providing the engaging command when moving from the first position to the second position, providing the locking command when placed in the third position while the front differential is in the engaged and unlocked mode, and providing the unlocking command when placed in the third position while the front differential is in the engaged and locked mode.

In some implementations of the present technology, the locking command and the locking command are provided by the differential lock switch when the differential lock switch is held in the third position for more than a predetermined time.

In some implementations of the present technology, the vehicle further comprises a brake control unit implementing an anti-lock braking system (ABS); the controller being further adapted for causing the brake control unit to disable the ABS when the front differential is in the engaged and locked mode.

In some implementations of the present technology, the vehicle is an off-road vehicle selected from an all-terrain vehicle and a side-by-side vehicle.

In some implementations of the present technology, the vehicle further comprises a handlebar pivotably connected to the frame and operatively connected to the front drivetrain, the differential lock switch being mounted on the handlebar.

In some implementations of the present technology, the vehicle further comprises a manual override control; the controller being further adapted for controlling the motor to limit a speed of the vehicle when the front differential is in the engaged and locked mode and the manual override control is not activated.

In some implementations of the present technology, the vehicle further comprises a manual override control; the controller being further adapted for controlling the motor to limit a speed of the motor when the front differential is in the engaged and locked mode and the manual override control is not activated.

In some implementations of the present technology, the vehicle further comprises a handlebar pivotably connected to the frame and operatively connected to the front drivetrain, the manual override control being mounted on the handlebar.

In some implementations of the present technology, the vehicle further comprises a steering assembly operatively connected to the front drivetrain; and a steering angle sensor operatively connected to the steering assembly; the controller being further operatively connected to the steering angle sensor and being further adapted for delaying or preventing changing the front differential from the engaged and unlocked mode to the engaged and locked mode when a steering angle indicated by the steering angle sensor exceeds a predetermined angle threshold.

In some implementations of the present technology, the vehicle further comprises a vehicle speed sensor operatively connected to one of the front and rear drivetrains; the controller being further operatively connected to the vehicle speed sensor and being further adapted for delaying or preventing changing the front differential from the engaged and unlocked mode to the engaged and locked mode when a vehicle speed indicated by the vehicle speed sensor exceeds a predetermined angle threshold.

In some implementations of the present technology, the vehicle further comprises an engine speed sensor operatively connected to the motor; the controller being further operatively connected to the engine speed sensor and being further adapted for delaying or preventing changing the front differential from the engaged and unlocked mode to the engaged and locked mode when a speed of the motor indicated by the engine speed sensor exceeds a predetermined angle threshold.

In some implementations of the present technology, the vehicle further comprises a gearbox sensor operatively connected to the transmission; the controller being further operatively connected to the gearbox sensor and being further adapted for delaying or preventing changing the front differential from the engaged and unlocked mode to the engaged and locked mode when the gearbox sensor indicates that the transmission is not in a predetermined state.

In some implementations of the present technology, the vehicle further comprises a throttle operator operatively connected a throttle and to the motor; a throttle opening sensor; the controller being further operatively connected to the throttle opening sensor and being further adapted for delaying or preventing changing the front differential from the engaged and unlocked mode to the engaged and locked mode when an opening of the throttle reported by the throttle opening sensor exceeds a predetermined opening threshold.

In some implementations of the present technology, the vehicle further comprises a controller area network (CAN) bus operatively connected to the controller; an indicator of a status of the CAN bus; the controller being further operatively connected to the CAN bus status indicator and being further adapted for delaying or preventing changing the front differential from the engaged and unlocked mode to the engaged and locked mode when the status of the CAN bus reported by the CAN bus status indicator indicates a loss of signal integrity.

In some implementations of the present technology, the vehicle further comprises a visual display operatively connected to the controller, the controller being further adapted for: causing the visual display to display an indication when the front differential is prevented from changing from the engaged and unlocked mode to the engaged and locked mode; and causing the visual display to display an indication when changing from the engaged and unlocked mode to the engaged and locked mode is delayed.

In some implementations of the present technology, the vehicle further comprises a visual display operatively connected to the controller and adapted for displaying a current disengaged mode, engaged and unlocked mode or engaged and locked mode of the front differential.

In some implementations of the present technology, the visual display comprises a cluster of the vehicle.

In some implementations of the present technology, the visual display comprises an icon appearing next to the differential lock switch.

According to yet another aspect of the present technology, there is provided a vehicle, comprising: a frame; a motor connected to the frame; a rear drivetrain connected to the frame; a front drivetrain connected to the frame, the front drivetrain comprising a lockable front differential; a manual override control; and a controller operatively connected to the front differential and to the manual override control, the controller being adapted for controlling the motor to limit a speed of the motor when the front differential is locked and the manual override control is not activated.

According to a still further aspect of the present technology, there is provided a vehicle, comprising: a frame; a motor connected to the frame; a rear drivetrain connected to the frame; a front drivetrain connected to the frame, the front drivetrain comprising a lockable front differential; a manual override control; and a controller operatively connected to the lockable front differential and to the manual override control, the controller being adapted for controlling the motor to limit a speed of the vehicle when the front differential is locked and the manual override control is not activated.

In some implementations of the present technology, the vehicle further comprises a handlebar pivotably connected to the frame and operatively connected to the front drivetrain, the manual override control being mounted on the handlebar.

According to yet another aspect of the present technology, there is provided a vehicle, comprising: a frame; a motor connected to the frame; a rear drivetrain connected to the frame; a front drivetrain connected to the frame, the front drivetrain comprising a lockable front differential; a brake control unit implementing an anti-lock braking system (ABS); and a controller operatively connected to the front differential and to the brake control unit, the controller being adapted for causing the brake control unit to disable the ABS when the front differential is locked.

In some implementations of the present technology, the front differential is selectably configurable in one of (i) a disengaged mode, (ii) an engaged and unlocked mode, and (iii) an engaged and locked mode, the vehicle further comprising a transmission adapted for directing power from the motor to the rear drivetrain and for selectably directing power to the front drivetrain.

In some implementations of the present technology, the vehicle further comprises a differential lock switch operatively connected to the front differential and to the controller, the differential lock switch being adapted for: providing a disengaging command to the front differential for placing the front differential in the disengaged mode; providing an engaging command to the front differential for placing the front differential in the engaged and unlocked mode; providing a locking command to the controller, the controller selectively causing the front differential to change from the engaged and unlocked mode to the engaged and locked mode when receiving the locking command; and providing an unlocking command to the controller, the controller causing the front differential to change from the engaged and locked mode to the engaged and unlocked mode when receiving the unlocking command.

For purposes of the present application, terms related to spatial orientation when referring to a vehicle and components in relation to the vehicle, such as "forwardly", "rearwardly", "left", "right", "above" and "below", are as they would be understood by a driver of the vehicle sitting thereon in an upright driving position, with the vehicle steered straight-ahead.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 7a is a perspective view of the differential of FIG. 6 with a cover removed for showing a mechanical lock driven by an actuator;

FIG. 7b schematically shows details of the actuator of FIG. 7a;

DETAILED DESCRIPTION

Figure 1:
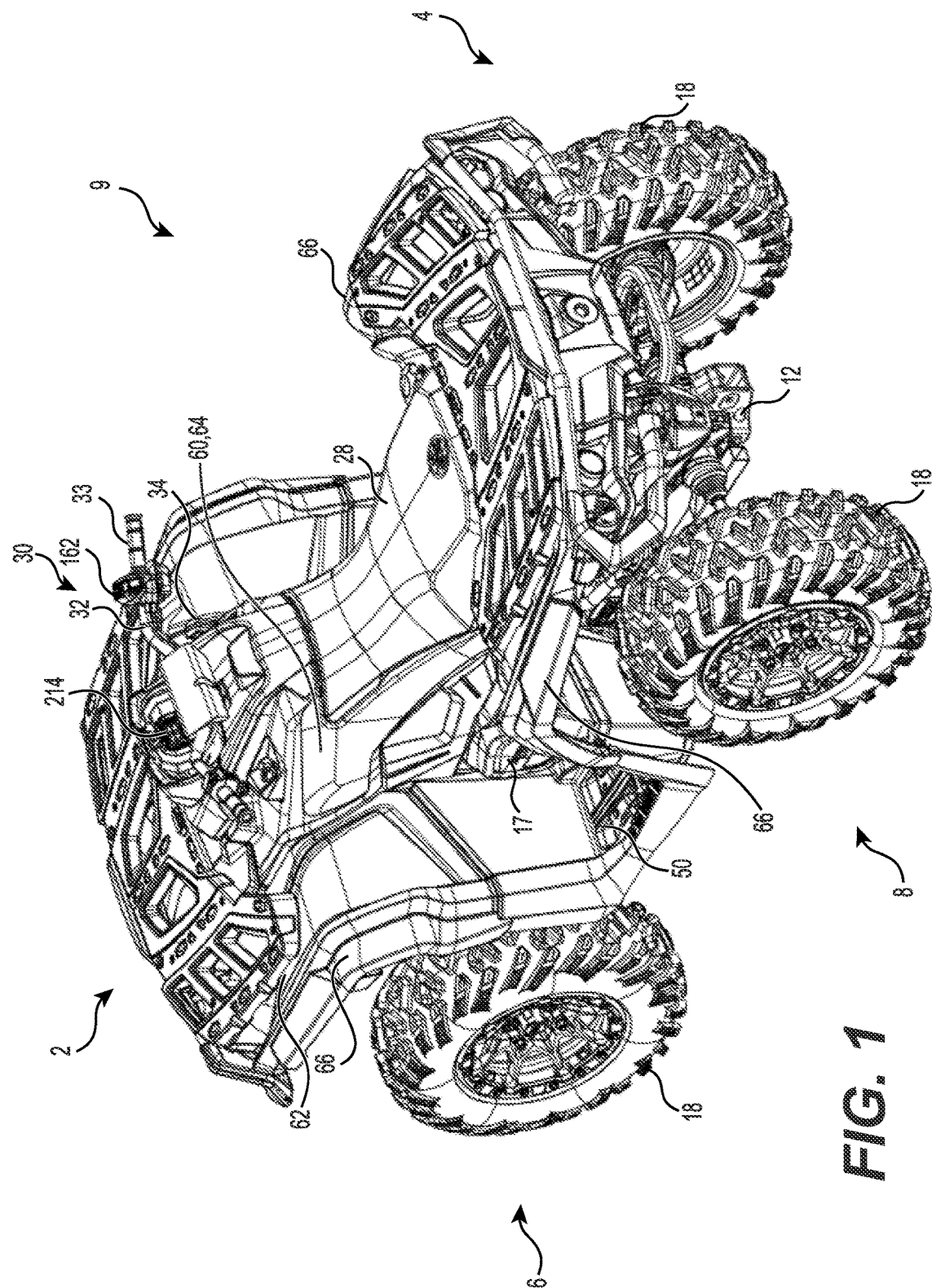
FIG. 1 is a perspective view, taken from a rear left side, of an all-terrain vehicle.
Figure 2:
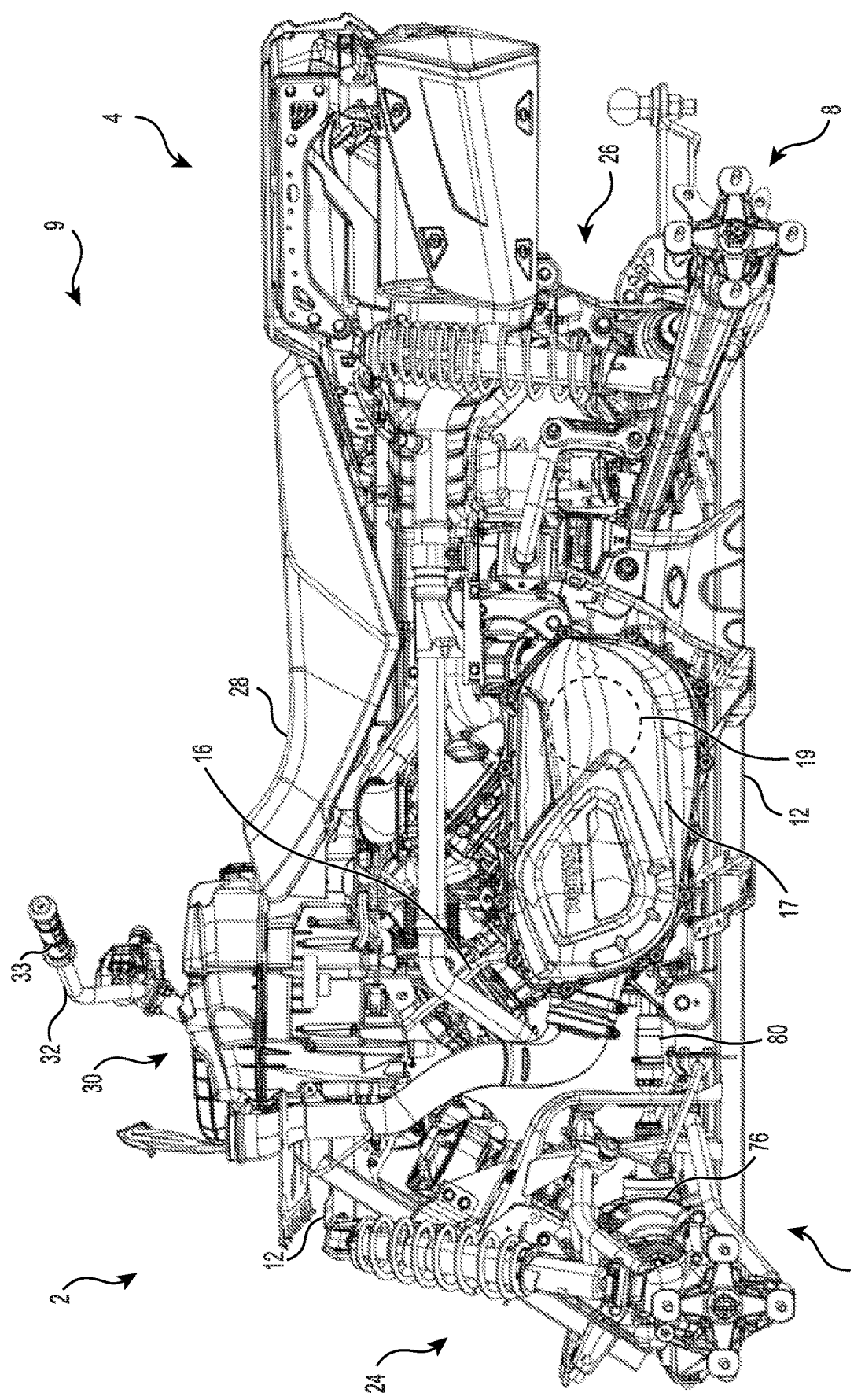
FIG. 2 is a left side elevation view of the frame, engine, continuously variable transmission, seat, steering assembly and front and rear suspension assemblies of the all-terrain vehicle of FIG. 1.

The present technology will be described with reference to a four-wheeled straddle-seat all-terrain vehicle (ATV) 9. However, it is contemplated that aspects of the present technology could be used in other types of vehicles, such as side-by-side vehicles (SSVs), dune buggies, and other off-road vehicles.

With reference to FIGS. 1 to 5, the ATV 9 has a front end 2 and a rear end 4 defined consistently with a forward travel direction of the ATV 9. The ATV 9 has a frame, for example a tubular frame 12. An internal combustion engine 16 for powering the ATV 9 is connected to the frame. It is contemplated that the ATV 9 may be powered by other types of motors, being for example powered by an electric motor.

The ATV 9 has a front drivetrain 6 and a rear drivetrain 8, which are both connected to the frame 12. The front drivetrain 6 has two front wheels 18 and the rear drivetrain 8 has two rear wheels 18, although a rear drivetrain having a single wheel 18 or having four wheels 18 is also contemplated. Each wheel 18 is provided with low-pressure balloon tires adapted for off-road conditions and for traversing rugged terrain.

The wheels 18 are operatively connected to the engine 16 via a transmission that, in the shown example, comprises a continuously variable transmission (CVT) 17 receiving power from the engine 16 and a gearbox 19 operatively connected to the CVT 17. A shifter 34 located underneath the right-hand side of a handlebar 32 is used by the driver to place the gearbox 19 in one of a high, low, neutral or reverse transmission positions. When a front differential 76 of the front drivetrain 6 is disengaged, the CVT 17 and the gearbox 19 direct power from the engine 16 to the rear wheels 18 only, allowing the ATV 9 to be operated in rear-wheel drive (or 2-wheel drive) mode. The CVT 17 and the gearbox 19 direct power from the engine 16 to both the rear wheels 18 and the front wheels 18 when the front differential 76 is engaged, allowing the ATV 9 to be operated in all-wheel drive (or 4-wheel drive) mode.

As illustrated on FIG. 1, the ATV 9 also includes fairings 60 including a front fascia 62 at the front end 2 of the ATV 9 and several side panels 64 extending over lateral sides of the ATV 9. A fender 66 is disposed over each wheel 18 to protect a driver and/or passenger from dirt, water and other debris being projected by the rotating wheels 18. The ATV 9 further includes a straddle-type seat 28 mounted to the frame 12 for accommodating a driver of the ATV 9. Footrests 50 are provided on either of the seat 28 and are disposed vertically lower than the seat 28 to support the driver's feet.

The front wheels 18 are suspended from the frame 12 by left and right front suspension assemblies 24 while the rear wheels 18 are suspended from the frame 12 by left and right rear suspension assemblies 26.

A steering assembly 30 operatively connected to the front wheels 18 is rotationally supported by the frame 12 to enable the driver to steer the ATV 9. The steering assembly 30 includes the handlebar 32 having a handle grip 33 at each end. The handlebar 32 is pivotably connected to the frame 12 and operatively connected to the front wheels 18 via a steering column 74. Operation of the handlebar 32 causes a power steering assembly including a power steering gearbox 31 assisted by an electric motor 29 to actuate steering linkages 70 that are operably connected to left and right front wheels 18. It is contemplated that the power steering electric motor 29 could be omitted. Other vehicles may include a steering wheel in place of the handlebar 32.

Figure 3:
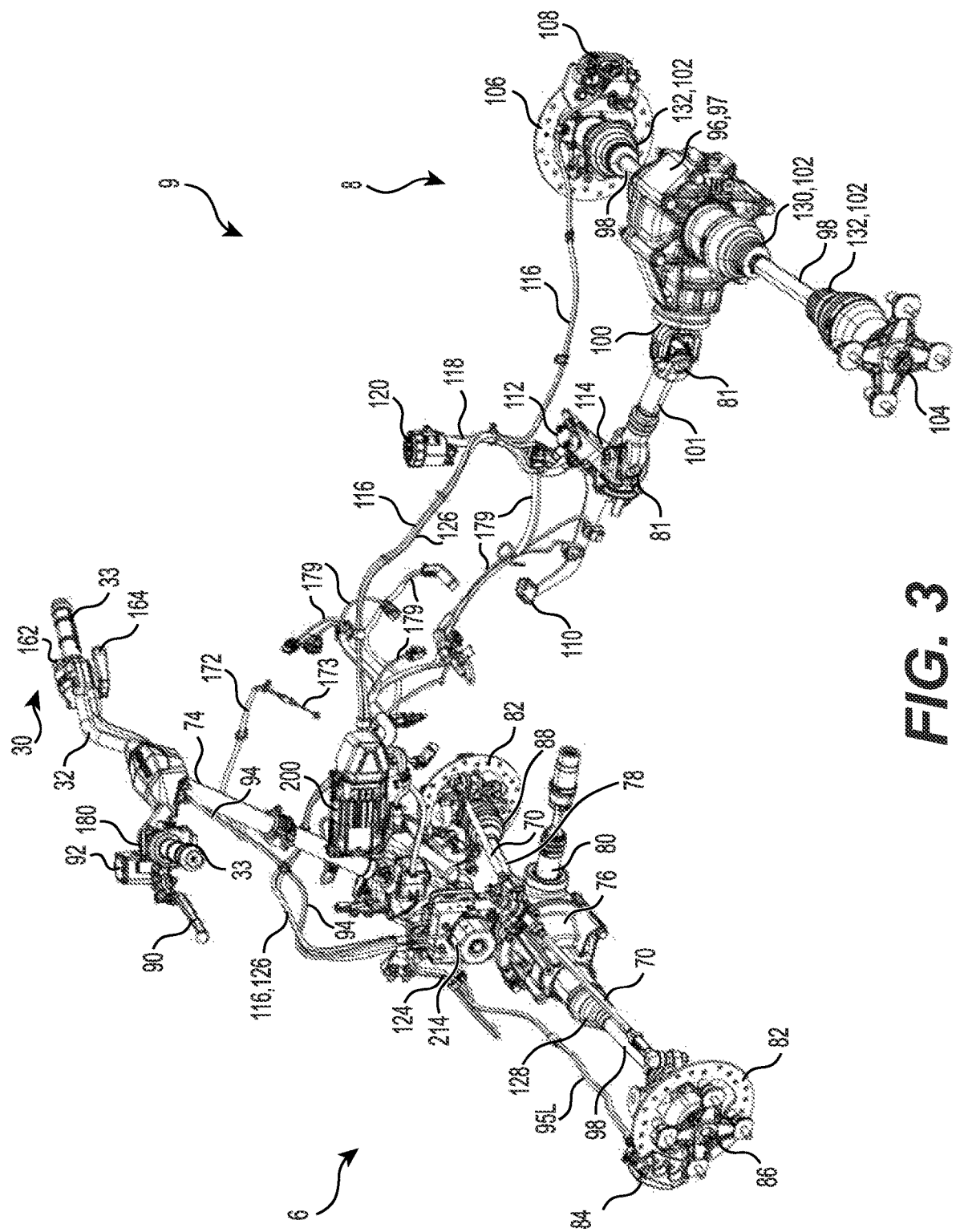
FIG. 3 is a perspective view, taken from a rear left side, of a steering assembly, front and rear drivetrains and brake assemblies of the all-terrain vehicle of FIG. 1.
Figure 4:
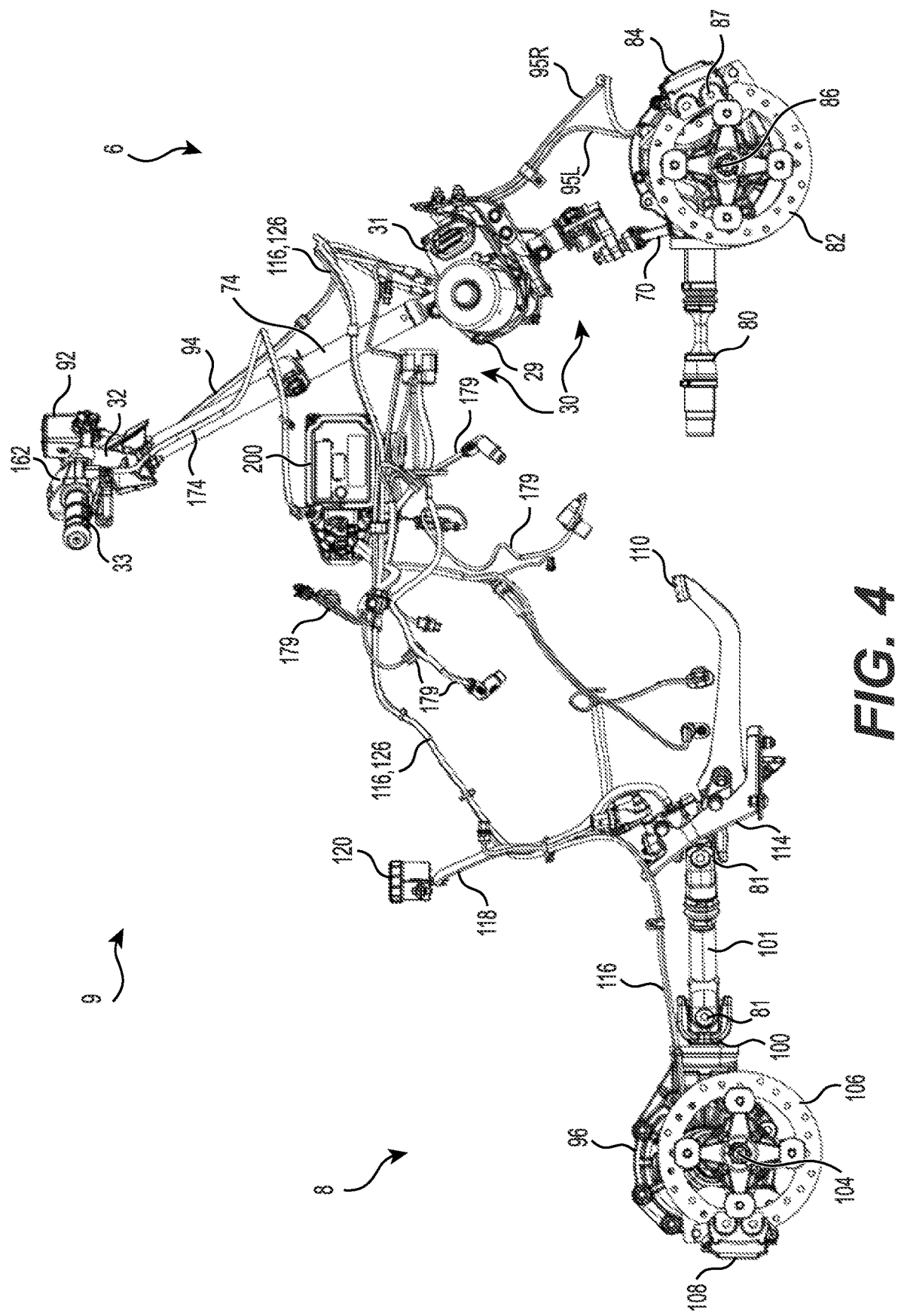
FIG. 4 is a right side elevation view of the steering assembly, the front and rear drivetrains and brake assemblies of the all-terrain vehicle of FIG. 1.
Figure 5:
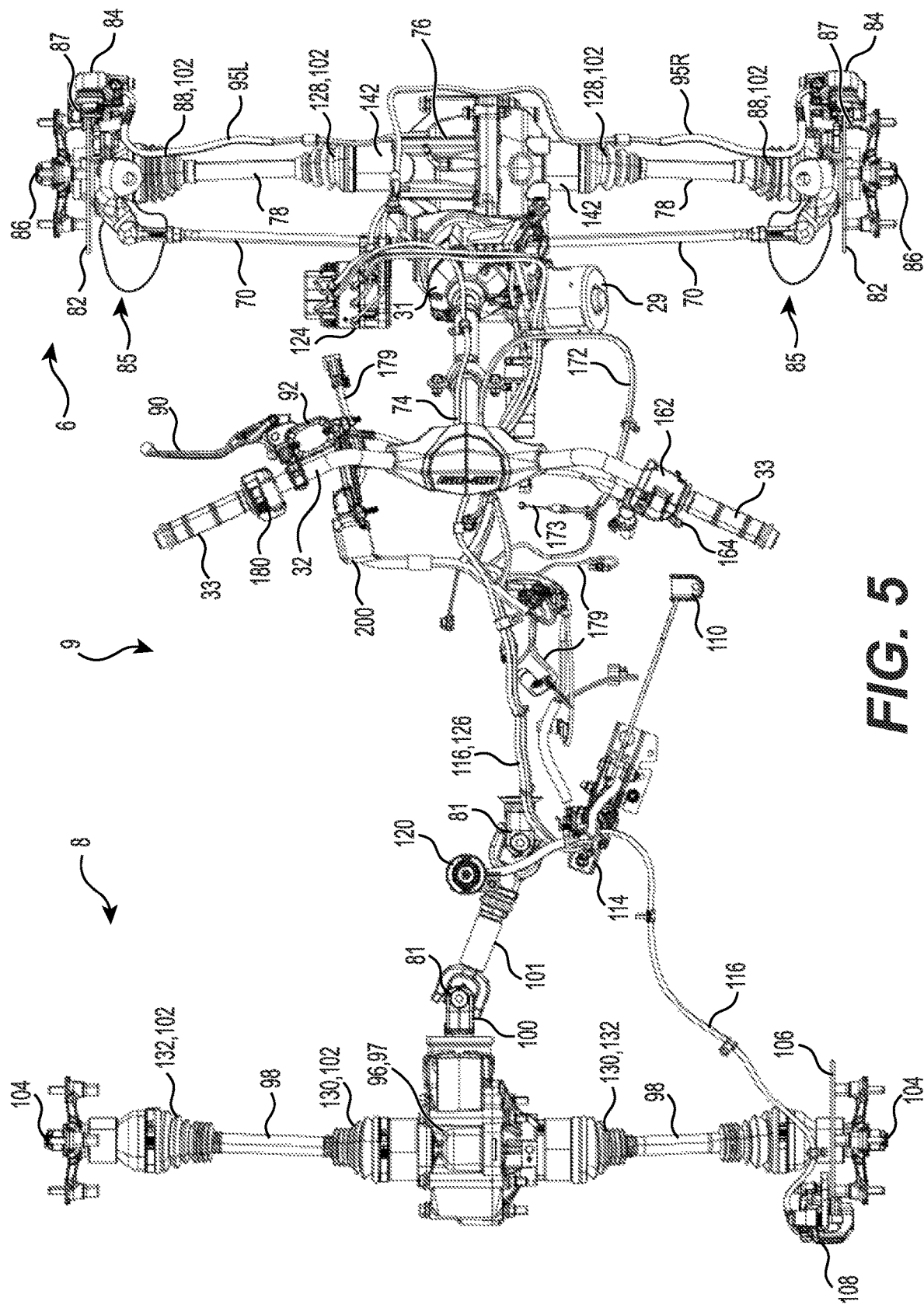
FIG. 5 is a top plan view of the steering assembly, the front and rear drivetrains and brake assemblies of the all-terrain vehicle of FIG. 1.
Figure 6:
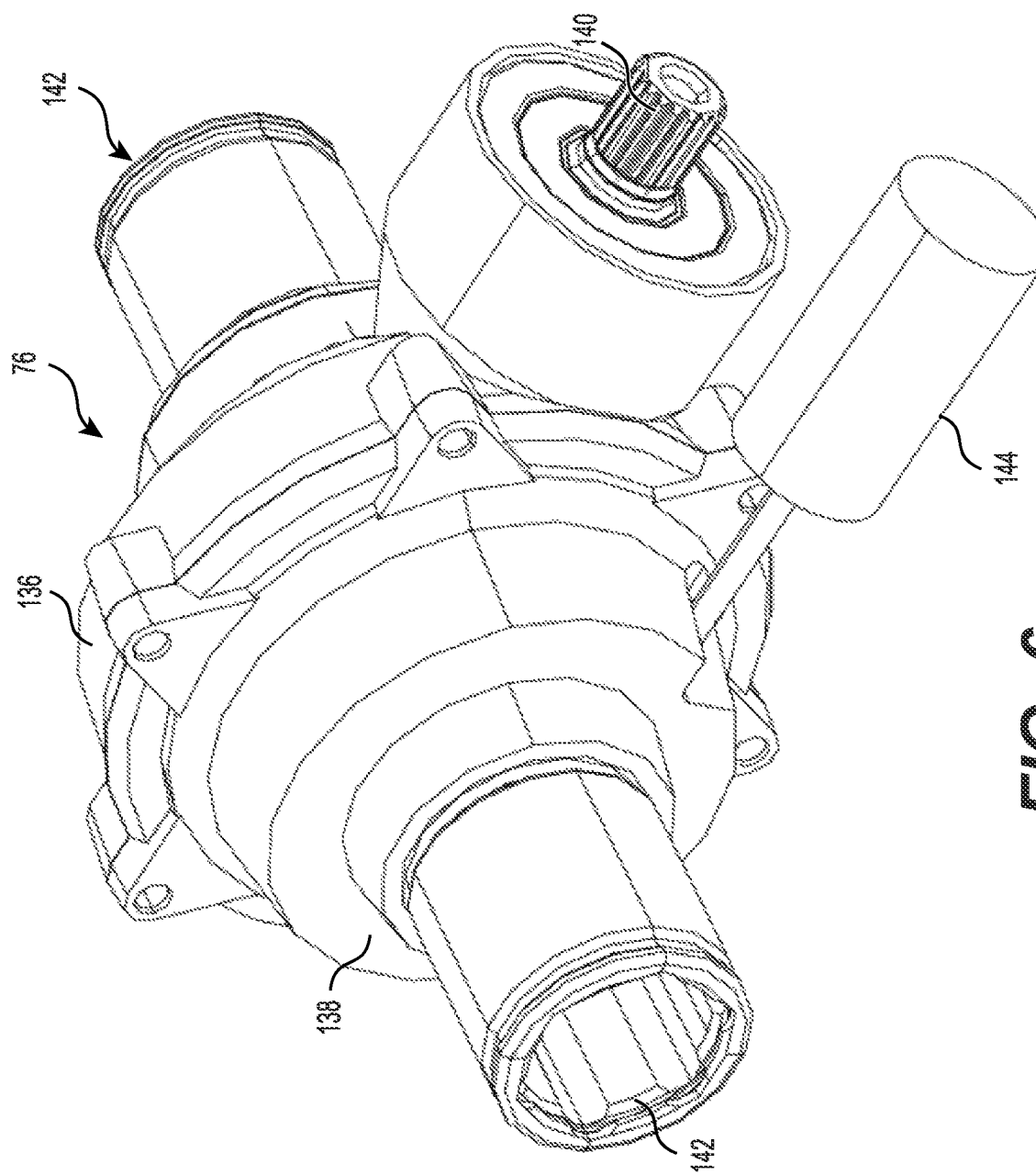
FIG. 6 is a perspective view of an engageable and lockable front differential of the vehicle of FIG. 1 according to an embodiment.

The ATV 9 can be operated in rear-wheel drive mode or in all-wheel drive mode. Referring to FIGS. 3, 4 and 5, the front drivetrain 6 of the ATV 9 includes the front differential 76, a pair of half shafts 78 connected to constant velocity (CV) joints 128 and 88, and shafts extending between the CV joints 88 and hubs 86, each of these shafts being supported by a corresponding kingpin 85. On each of its left and right sides, the front differential 76 is connected to respective CV joint 128 connected to one end of a respective half shaft 78. Another CV joint 88 is connected to an opposed end of each half shaft 78. Each CV joint 88 and 128 is protected by a respective boot cover 102. A front wheel 18 and a front disc 82 are mounted to each hub 86 and are supported by the corresponding kingpin 85. On each side of the front differential 76, the front wheel 18, the front disc 82, the CV joint 88, the half shaft 78 and the CV joint 128 are operably connected to rotate together, at a common speed.

Left and right front brake assemblies include the front discs 82 and further include front calipers 84 mounted on the kingpins 85. The left and right front calipers 84 are respectively connected to hoses 95L and 95R. Each front caliper 84 includes a pair of brake pads 87 positioned on opposite sides of the respective front disc 82. Actuating the front calipers 84 by application of a fluid pressure in the hoses 95L and/or 95R causes the brake pads 87 to apply pressure on the respective front discs 82.

The rear drivetrain 8 of the ATV 9 includes a rear spool gear 96 enclosed within a housing 97, an input shaft 100 of the spool gear 96, CV joints 130 and 132, half shafts 98 and shafts extending between the CV joints 132 and hubs 104. The input shaft 100 is operably connected to a rear driveshaft 101 by a universal joint 81. The rear driveshaft 101 is connected by another universal joint 81 to the gearbox 19 to receive power from the engine 16. On each of its left and right sides, the spool gear 96 is connected to a CV joint 130 connected to one end of a respective half shaft 98. Another CV joint 132 is connected to an opposed end of each half shaft 98. The CV joints 130 and 132 are protected by respective boot covers 102. The hubs 104 are supported by lower ends of rear suspension assemblies 26. A rear wheel 18 is mounted to each hub 104.

The spool gear 96 transmits a torque received from the engine 16 to the left and right rear wheels 18. The spool gear 96 causes the CV joints 130, the half shafts 98, the CV joints 132, the wheel shafts 104 and the rear wheels 18 located on both left and right sides of the ATV 9, as well as a single rear disc 106, to rotate together, at a common speed.

A single rear brake assembly includes the single rear disc 106, mounted to the right hub 104, and a single rear caliper 108. Although the single rear disc 106 as illustrated is located on the right-hand side of the ATV 9, mounting the single rear disc 106 on the left-hand side of the ATV 9 is also contemplated. The single rear caliper 108 is supported by a right rear suspension assembly 26. The single rear caliper 108 is connected to a hose 116. The single rear caliper 108 includes a pair of rear brake pads (not shown) positioned on opposite sides of the single rear disc 106. Actuating the single rear caliper 108 by application of a fluid pressure in the hose 116 causes the rear brake pads to apply pressure on the single rear disc 106. No rear brake assembly is present on the left-hand side of the ATV 9, where the left rear wheel 18 is supported by the left rear suspension assembly 26. Providing rear brake assemblies on both sides of the rear drivetrain 8 of the ATV 9 is also contemplated.

A user of the ATV 9 may actuate either or both of two (2) user actuated braking input devices, for example a hand lever 90 and a foot lever 110, to independently or jointly deliver a braking command for slowing down or stopping the ATV 9. The hand lever 90 and a front master cylinder 92 are mounted on the handlebar 32. The front master cylinder 92 can be directly filled with braking oil. Actuating the hand lever 90 causes the front master cylinder 92 to transmit the braking command to a braking control unit 124. In the implementation as shown, the braking command from the hand lever 90 is in the form of a fluid pressure in a hose 94 connected between the front master cylinder 92 and the braking control unit 124. In another implementation, actuation of the hand lever 90 may cause the application of a tension on a cable to deliver the braking command to the braking control unit 124. When the hand lever 90 is actuated, a signal is sent for turning on the brake lights.

The foot lever 110 and a rear master cylinder 112 are mounted on a bracket 114 supported by a lower portion of the frame 12. The rear master cylinder 112 receives braking oil via a hose 118 from the reservoir 120. Actuating the foot lever 110 causes the rear master cylinder 112 to exert a fluid pressure in a hose 126, also resulting in the delivery of the braking command to the braking control unit 124. As in the case of the hand lever 90, implementations of the foot lever 110 applying the braking command to the braking control unit 124 by the application of a tension on a cable are also contemplated. The braking command is proportional (either linearly or non-linearly) to the pressure applied on the foot lever 110. When the foot lever 110 is actuated, a signal is sent for turning on the brake lights.

Figure 14:
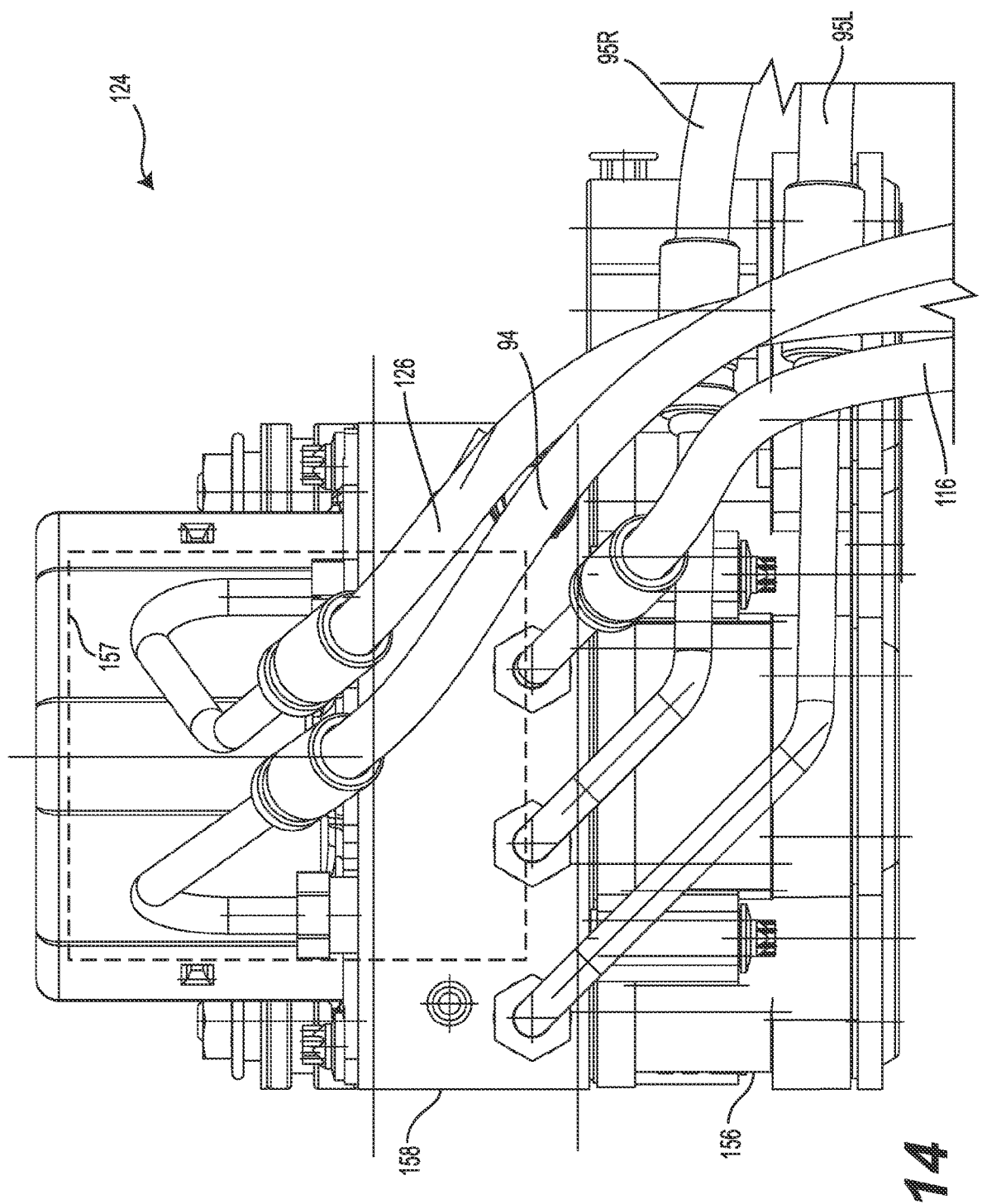
FIG. 14 is an enlarged top plan view of a braking control unit.

The braking control unit 124 may receive the braking command from the front master cylinder 92, via the hose 94, or from the rear master cylinder 112, via the hose 126, or from both master cylinders 92 and 112 and accordingly apply front and/or rear braking of the ATV 9. As shown on FIG. 14, the braking control unit 124 comprises an electronic controller 156 that commands a motor 157 of a hydraulic pump 158 to direct pressure in the hoses 95L, 95R and 116. The braking control unit 124 may implement an anti-lock braking system (ABS) in which wheel speed sensors (not shown) report speeds of each of the wheels 18, or speeds of each of the half-shafts 78 and 98, to the electronic controller 156 of the braking control unit 124. To prevent locking of the wheels 18, the braking control unit 124 may temporarily release the pressure applied by one or both of the front calipers 84 and/or by the rear caliper 108, on the corresponding front discs 82 and/or rear disc 106, of a wheel 18 found to be rotating at a significantly lower speed than the other wheels 18.

The front differential 76 can be controlled to adopt one of a disengaged mode and an engaged mode. The ATV 9 operates in rear-wheel drive mode when the front differential 76 is disengaged and in all-wheel drive mode when the front differential 76 is engaged. Additionally, the front differential may be selectively placed in an unlocked state and in a locked state while in the engaged mode. When in engaged mode, whether locked or unlocked, the front differential 76 receives at its input shaft 140 a torque from the engine 16 via a front propeller shaft 80 that is in turn operatively connected to the gearbox 19. In turn, the front differential 76 transmits the torque to the front wheels 18 via the CV joints 128, the front half shafts 78, and the CV joints 88. When unlocked, the front differential 76 may send unequal torque to the two front wheels 18 so that the left front wheel 18 and the right front wheel 18 may rotate at different speeds. When locked, the front differential 76 sends equal torque to the two front wheels 18 that both rotate at a same speed.

Turning now to FIGS. 6, 7a, 7b and 8a to 8c, the front differential 76 is contained in a casing 136 having a cover 138, the cover 138 being removed on FIG. 7a. The front differential 76 has an input shaft 140 operatively connected to the front propeller shaft 80. Left and right output shafts 142 of the front differential 75 are operatively connected to respective half shafts 78 via respective CV joints 128. An actuator 144 drives a mechanical lock 146 for selectively disengaging, engaging or engaging and locking the front differential 76. The actuator 144 has a pair of electrical connectors 148 for receiving commands for disengaging, engaging or engaging and locking the front differential 76. As shown on FIG. 7b, the actuator 144 comprises an electric motor 147 driven by an integrated circuit 149 receiving the commands from the electrical connectors 148. It is contemplated that the actuator 144 may be implemented as a solenoid.

Within the front differential 76, a ring gear 300 is operatively connected to the input shaft 140 via a gear (not shown) on the input shaft 140 and rotates therewith. A planetary gear housing 302 also rotates with the ring gear 300 and the input shaft 140. When the front differential 76 is disengaged, a left planetary gear 302L contained in the planetary gear housing 302 is disengaged from the left output shaft 142 and no torque is transmitted to the left front wheel 18. A right planetary gear 302R is connected to the right output shaft 142, but the disconnection between the left planetary gear 302L and the left output shaft 142 results in no torque being transferred the front differential 76 to the right output shaft 142. The output shafts 142, the front half shafts 78 and the front wheels 18 thus rotate independently from the input shaft 140. When the front differential 76 is engaged, the torque from the input shaft 140 is transmitted via the left and right planetary gears 302L and 302R to the output shafts 142. As long as the front differential 76 is engaged and not locked, the left and right planetary gears 302L and 302R may transfer the torque unevenly between the left and right front output shafts 142, depending on riding conditions of the ATV 9. When the front differential 76 is engaged and locked, relative motion between the left and right output shafts 142 is prevented or entirely eliminated.

Figure 8A:
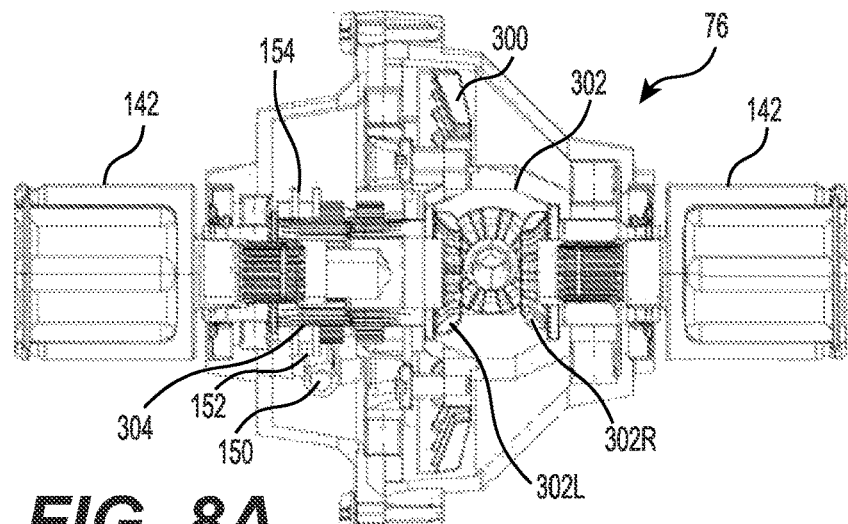
FIGS. 8a, 8b and 8c are cross-sectional views of the differential of FIG. 6 in disengaged mode, engaged and unlocked mode, and engaged and locked mode, respectively.
Figure 8B:
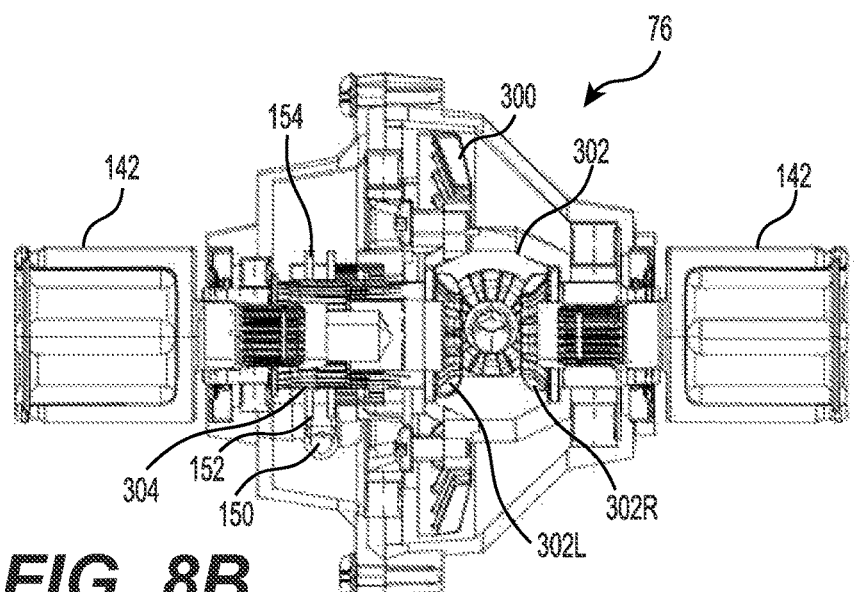
Figure 8C:
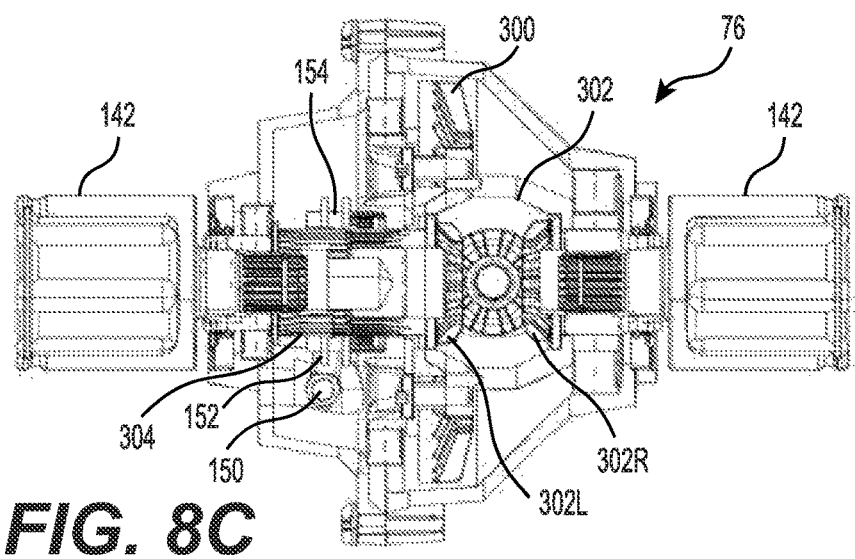

In more details, the mechanical lock 146 includes a rod 150 driving a lever 152. As shown on FIG. 8a, when the front differential 76 is disengaged, the lever 152 is held in a first angular position by the actuator 144 and the rod 150 to place a sleeve 154 away from the ring gear 300. In that position, the left planetary gear 302L is disengaged from an intermediate shaft 304 connected to the left output shaft 142. No torque is transmitted to the intermediate shaft 304 and to the left output shaft 142, thereby disengaging the front differential 76. FIG. 8b shows that the rod 150 is rotated in a second angular position by the actuator 144, causing the lever 152 to move the sleeve 154 closer to the ring gear 300. In that position, the sleeve 154 connects the intermediate shaft 304 to the left planetary gear 302L. Depending on a torque on each front wheel 18 from the ground, the torque received on the input shaft 140 is transferred by the front differential 76 to either or both of the front wheels 18. In that position, the front differential 76 is engaged without being locked. FIG. 8c shows that the rod 150 is rotated further in a third angular position by the actuator 144. In this third position, the sleeve 154 directly engages the ring gear 300 to lock the intermediate shaft 304 to the ring gear 300, thus locking the front differential 76.

When the differential 76 is disengaged, no connection is made between the input shaft 140 and the output shafts 142 so no torque is transferred from the engine 16, the CVT 17 and the gearbox 19 to the output shafts 142; in this case, no torque is applied on the front wheels 18 and the ATV 9 is driven in two-wheel drive mode, more specifically in rear-wheel drive mode. When the differential 76 is engaged while in the unlocked state, a torque is received at the input shaft 140 and transmitted to the output shafts 142; in this case, the ATV 9 is driven in all-wheel drive mode. In this mode, unequal torque may be transmitted by the front differential 76 to the left and right wheels 18, which may rotate at unequal speeds depending on driving conditions. When the differential 76 is engaged while in the locked state, the torque is received at the input shaft 40 and an equal torque is transmitted to the output shafts 142; in this case, the ATV 9 is driven in all-wheel drive mode without allowing any speed difference between the front wheels 18.

Figure 9:
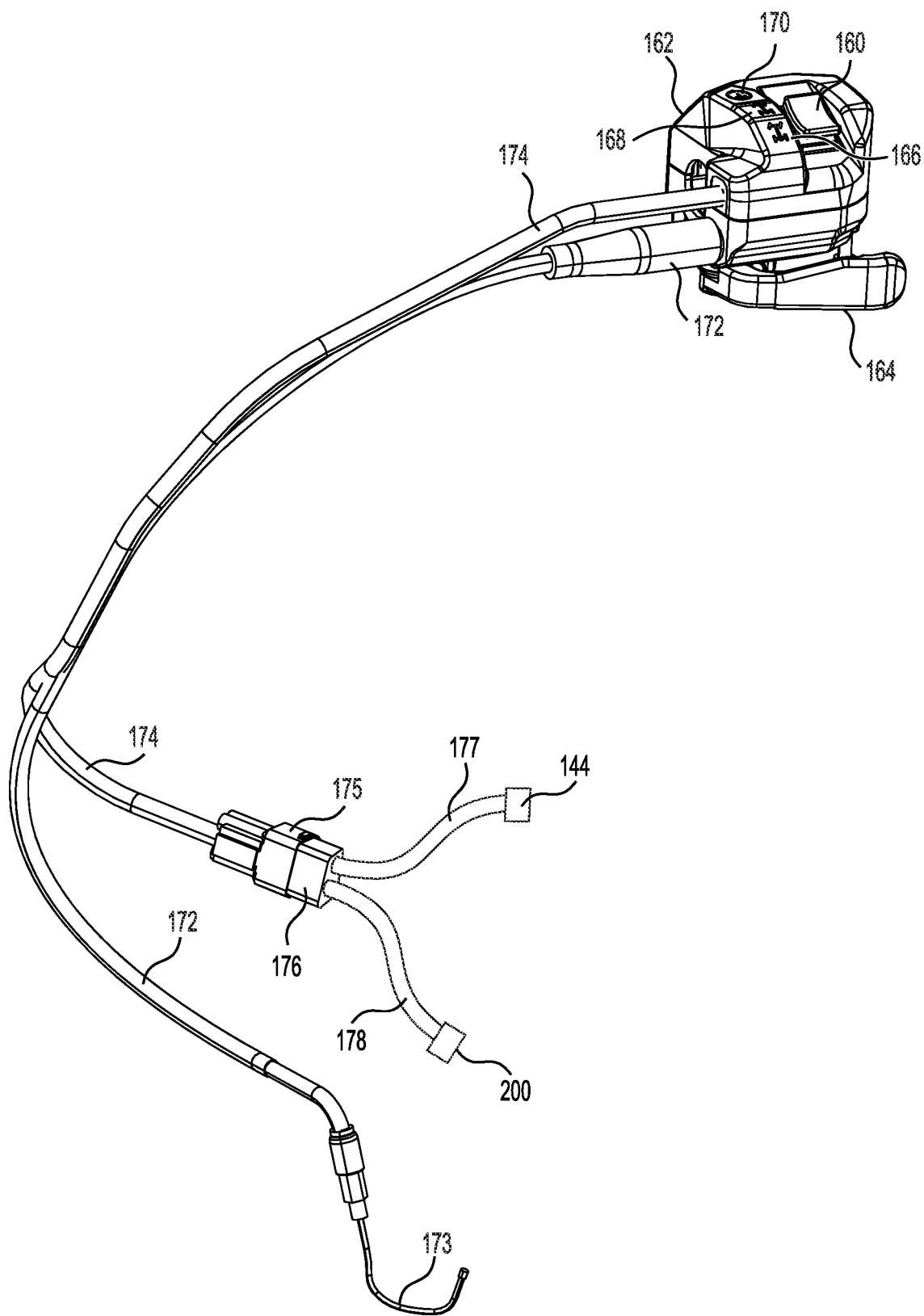
FIG. 9 is a rear perspective view of a right switch control housing for the vehicle of FIG. 1 and of wires connecting the right switch control housing to the differential of FIG. 6 and to a controller according to an embodiment.

The commands to selectively disengage or engage the front differential 76 are received at the actuator 144 from a differential lock switch 160 of a right switch control housing 162 mounted on a right-hand side of the handlebar 32, and result from an actuation of the differential lock switch 160 by the user of the ATV 9. The commands to change the front differential 76 between the unlocked state and the locked state are received at the actuator 144 from a controller, for example an engine control unit (ECU) 200, which translates another actuation of the differential lock switch 160 by the user of the ATV 9. Referring to FIG. 9, the right switch control housing 162 supports the differential lock switch 160, a throttle operator 164, and a visual display comprising icons 166, 168 and 170 that allow visualizing a current mode of operation of the front differential 76. The throttle operator 164 is connected to a throttle (not shown) of the engine 16 via a cable 173 that extends within a wire sheath 172. It is contemplated that the cable 173 connecting the throttle operator 164 to the throttle may be replaced by a drive-by-wire signal in which commands from the throttle operator 164 may be electronically transmitted to the throttle. The differential lock switch 160 is connected to a plug 175 via a wire 174 that extends from the right switch control housing 162. The plug 175 is connected to another plug 176. Two wires 177 and 178 extend from the plug 176. The wire 177 transmits control signals from the differential lock switch 160 directly to the actuator 144 (schematically illustrated on FIG. 9) and the wire 178 transmits control signals from the differential lock switch 160 to the ECU 200 (also schematically illustrated on FIG. 9). The wires 174, 177 and 178 may implement a controller area network (CAN) bus. Other wires 179 connect the ECU 200 to other systems of the ATV 9.

The differential lock switch 160 may be placed in three distinct positions. First, second and third positions of the differential lock switch 160 are respectively shown on FIGS. 10a, 10b and 10c. The second position is intermediate the first and third positions and the differential lock switch 160 is biased to return to the second position when released from the third position. As such, the driver may place the differential lock switch 160 in one of the first and second positions, following which the differential lock switch 160 maintains the position selected by the driver. If the driver depresses the differential lock switch 160 to place it in the third position and then releases the differential lock switch 160, the differential lock switch 160 returns to the second position.

When the differential lock switch 160 is in the first position, it sends a disengaging command to the actuator 144 to place the front differential 76 in disengaged mode. When the differential lock switch 160 is in the second position, it sends an engaging command to the actuator 144 to place the front differential 76 in engaged mode. As a result, moving the differential lock switch 160 from the first position to the second position places the front differential 76 in engaged mode without locking the front differential 76. It may be noted that the disengaging and engaging commands are sent directly to the actuator 144 by the differential lock switch 160, without passing through the ECU 200.

Moving the differential lock switch 160 from the second to the third position may selectively cause changing of the front differential 76 between the unlocked state and the locked state. Given that the third position may be reached from the second position, the front differential 76 is expected to already be in engaged mode when the differential lock switch 160 is placed in the third position. In the third position, the differential lock switch 160 may send a locking command or an unlocking command to the ECU 200, requesting to change the front differential 76 from the unlocked state to the locked state or from the locked state to the unlocked state. To this end, a signal is sent from the differential lock switch 160 to the ECU 200 when the differential lock switch 160 is placed in the third position, the signal ending when the differential lock switch 160 is released from its third position and returns to the second position. The ECU 200 translates this signal into the locking command or to the unlocking command, depending on the current status of the front differential 76. In an embodiment, the ECU 200 may immediately translate the signal received when the differential lock switch 160 is placed in the third position into the locking or unlocking command.

Optionally, the ECU 200 may detect that the differential lock switch 160 is maintained in the third position for at least a predetermined time before translating this signal into the locking or unlocking command. In an embodiment, the ECU 200 sends a control signal to the actuator 144 to lock the front differential 76, if previously in the unlocked state, or to unlock the front differential, if previously in the locked state. In this embodiment, the ECU 200 causes the actuator 144 to change the unlocked or locked state of the front differential 76 while the differential lock switch 160 is still in the third position after the predetermined time, or as soon as the differential lock switch 160 is released and returns to the second position after having been held for at least the predetermined time.

Figure 11:
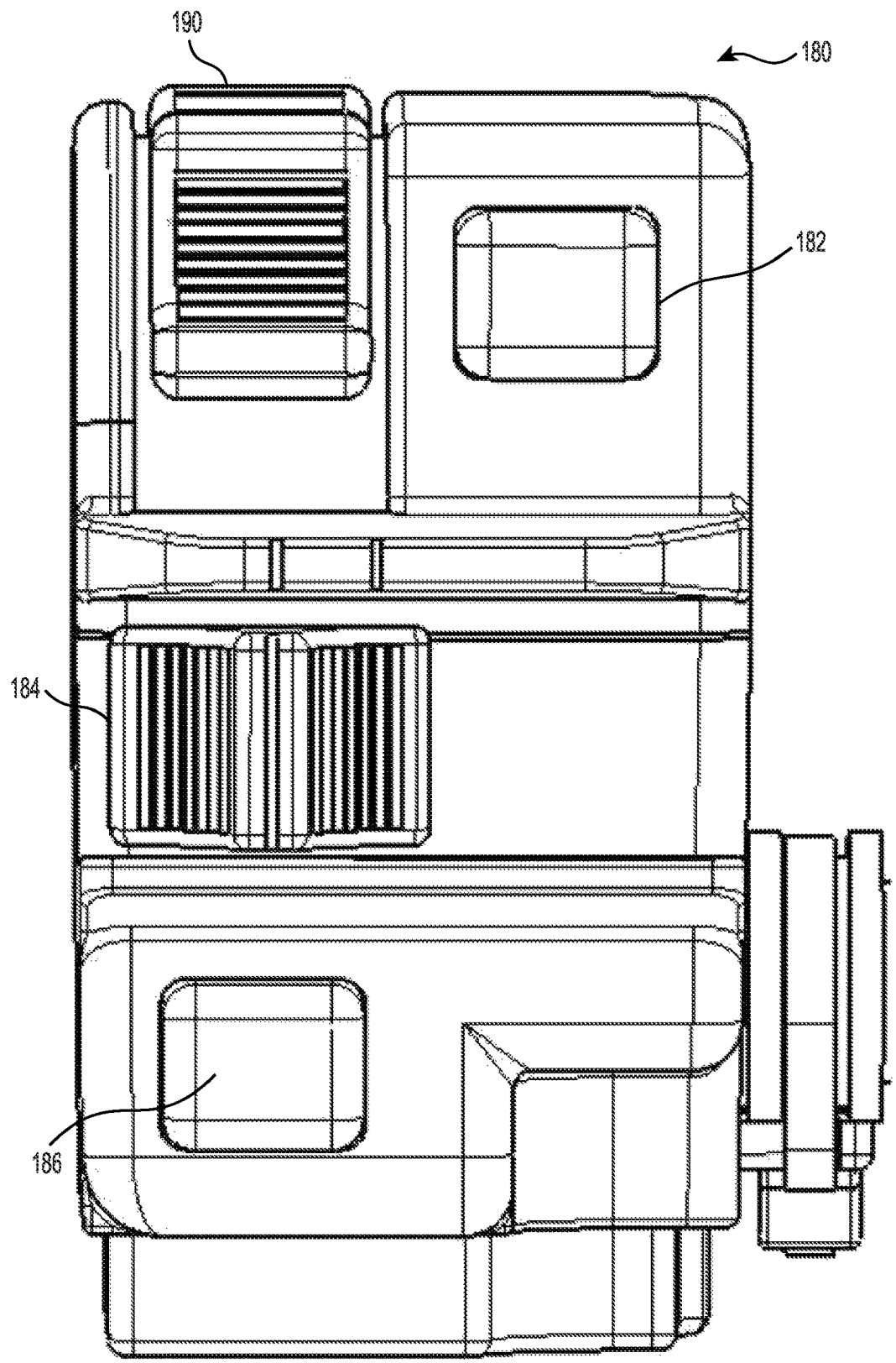
FIG. 11 is a rear elevation view of a left switch control housing for the vehicle of FIG. 1, according to an embodiment.

In another embodiment, changing the front differential 76 from the unlocked state to the locked state may be conditional. One or more additional conditions may cause the ECU 200 to delay acting upon the locking command or may entirely prevent the ECU 200 from acting upon the locking command. Some of these additional conditions are based on inputs provided to the ECU 200 by other components of the ATV 9. For example, FIG. 11 shows a left switch control housing 180 mounted on a left-hand side of the handlebar 32. The left switch control housing 180 supports a start button 182, a stop switch 184, an override button 186, and a headlight switch 190. The start button 182, the stop switch 184 and the override button 186 are operatively connected to the ECU 200 and are operated by the driver of the ATV 9 for starting the ATV 9, initiating ignition of the engine 16, enforcing a maximum speed limit of the ATV 9 and disabling the maximum speed limit. The headlight switch 190 controls the headlights either directly or via the ECU 200.

Figure 12:
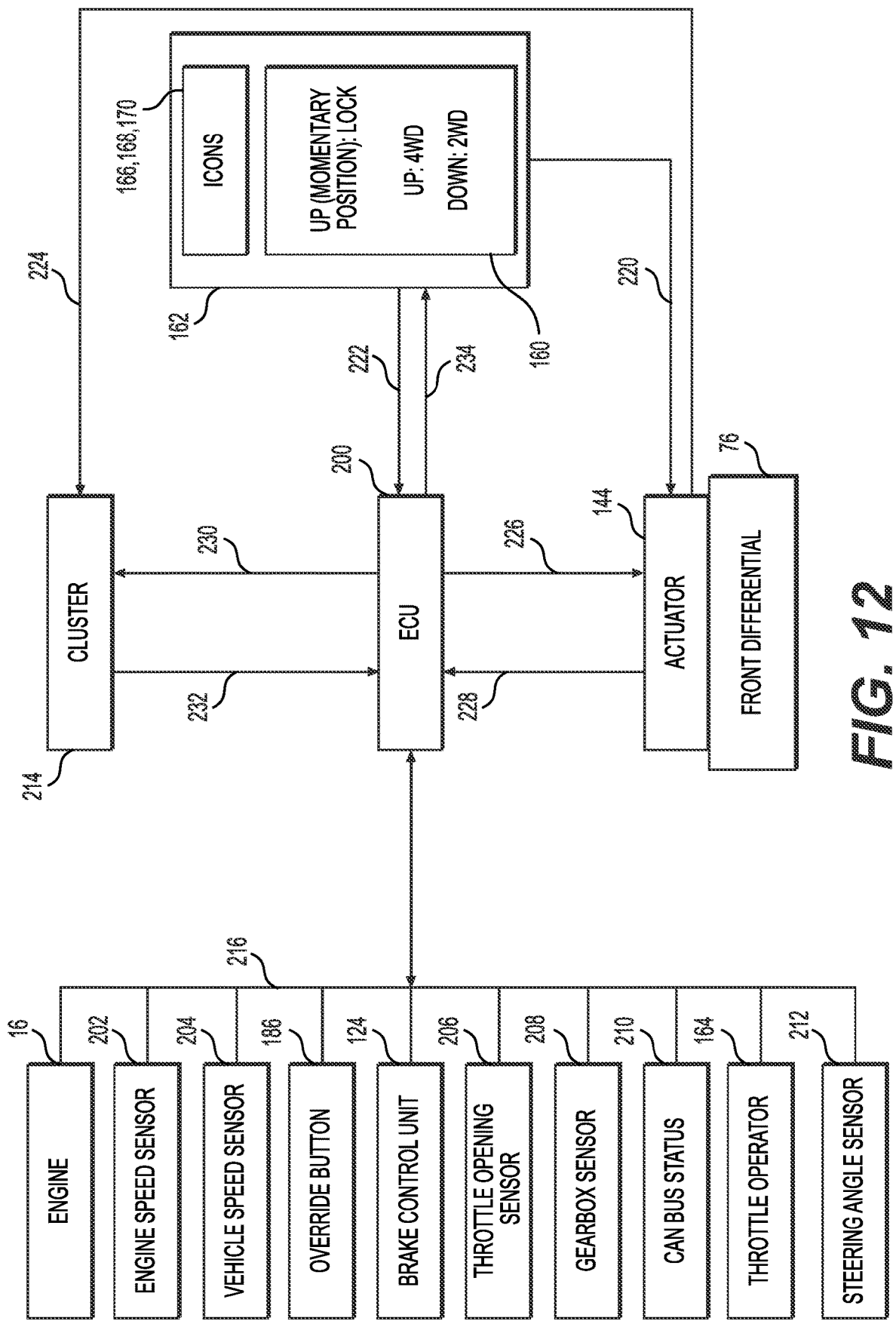
FIG. 12 is a block diagram showing connections of the front differential and of electrical components of the vehicle of FIG. 1 according to an embodiment.

FIG. 12 shows how the ECU 200 interacts with the actuator 144, the differential lock switch 160 held by the right switch control housing 162, the throttle operator 164, and the icons 166, 168, 170, and with other components of the ATV 9, to control the front differential 76. Some of the interactions between the ECU 200 and the other components shown on FIG. 12 may take place over a CAN bus 216. The ECU 200 is connected to the differential lock switch 160, the actuator 144, the front differential 76, the engine 16, the brake control unit 124, and the override button 186, all of which have been introduced hereinbefore. The ECU 200 may also be connected to an engine speed sensor 202 operatively connected to the engine 16, a vehicle speed sensor 204 operatively connected to at least one of front drivetrain 6 and the rear drivetrain 8, a throttle opening sensor 206, which is operatively connected to the throttle operator 164, to the cable 173 or to the throttle valve (not shown) of the engine 16, a gearbox sensor 208 operatively connected to the gearbox 19 or to the shifter 34, a CAN bus status indicator 210 tracking signal integrity on the CAN bus 216, and a steering angle sensor 212 operatively connected to the steering assembly 30. In an embodiment, the throttle opening sensor 206 and/or the CAN bus status indicator 210 may be implemented in the form of software functions within the ECU 200, given that information necessary allowing the ECU 200 to determine an opening of the throttle and to determine a status of the CAN bus 216 may already be available within the ECU 200.

The ECU 200 may further be connected to a visual display, such as cluster 214 mounted in view of the driver of the ATV 9, the cluster 214 being adapted for displaying various information elements to the driver. Alternatively or in addition, the ECU 200 may be connected to the icons 166, 168 and 170 of the right switch control housing 162.

The differential lock switch 160 sends commands 220 to the actuator 144 for engaging and disengaging the front differential 76. The differential lock switch 160 also sends a signal 222 to the ECU 200 as a command to lock or unlock the differential 76 when placed in the third position. In one embodiment, the signal 222 is sent as soon as the differential lock switch 160 is placed in the third position and the ECU 200 immediately interprets the signal 222 as a command to engage or disengage the front differential 76. In another embodiment, the signal 222 is sent continuously while the differential lock switch 160 is maintained in the third position and the ECU 200 interprets the signal 222 as the command to engage or disengage the front differential when the differential lock switch 160 has been held in the third position for at least the predetermined time, or when it is released after having been held in the third position for at least the predetermined time. In a further embodiment, the differential lock switch 160 only sends the signal 222 after it has been held in the third position for the predetermined time. The actuator 144 sends digital feedback information 224 to the cluster 214 to allow the cluster 214 to display a current status of the front differential 76. When the ECU 200 determines that conditions are met for locking or unlocking the front differential 76, it sends a corresponding control signal 226 to the actuator 144. In response, the actuator 144 may send an electronic feedback signal 228 to the ECU 200 to indicate whether the front differential 76 is in unlocked state or in locked state. Sending a mechanical feedback from the front differential 76 to the ECU 200 to indicate whether the front differential 76 is in unlocked or in locked state is also contemplated. The ECU 200 may compare the information contained in the electronic feedback signal 228 with a most recent control signal 226 to determine whether the most recent control signal 226 has effectively been properly acted upon by the actuator 144. The ECU 200 may send information 230 related to the general operation of the ATV 9 or related to the operation of the front differential 76 to the cluster 214. The driver may enter commands on the cluster 214, these commands being relayed to the ECU 200 via signals 232.

When the ECU 200 detects the locking command provided by the differential lock switch 160, it may check values provided by one or more of the engine speed sensor 202, the vehicle speed sensor 204, the throttle opening sensor 206, the gearbox sensor 208, the CAN bus status indicator 210, and the steering angle sensor 212. The ECU 200 may delay or prevent sending the control signal 226 requesting the actuator to lock the front differential 76 under some conditions. The control signal 226 may be delayed or prevented when the engine speed reported by the engine speed sensor 202 exceeds a predetermined engine speed threshold, for example 4000 RPM. The control signal 226 may also be delayed or prevented when the vehicle speed reported by the vehicle speed sensor 204 exceeds a predetermined vehicle speed threshold, for example 40 km/h.

The control signal 226 may further be delayed or prevented when an opening of the throttle reported by the throttle opening sensor 206 exceeds a predetermined opening threshold, for example a 30% throttle opening. The control signal 226 may also be delayed or prevented when the gearbox sensor 208 indicates that the CVT 17 is not in a predetermined state, for example reverse gear or low forward gear. The ECU 200 may also delay or prevent sending the control signal 226 when the status of the CAN bus 216 reported by the CAN bus status indicator 210 indicates a loss of signal integrity on the CAN bus 216. The ECU 200 may also delay or prevent sending the control signal 226 when a steering angle indicated by the steering angle sensor 212 exceeds a predetermined angle threshold, for example 25 degrees. The ECU 200 provides the control signal 226 requesting the actuator to lock the front differential 76 to the actuator 144 when none of these conditions is present. In an embodiment, any one of the above conditions may cause the ECU 200 to abandon the request to lock the front differential 76. In another embodiment, the ECU 200 may delay the request to lock the front differential 76 and send to the actuator 144 the control signal 226 requesting the actuator to lock the front differential 76 when the conditions having prevented the locking are not longer present.

Locking the front differential 76 may cause the ECU 200 to adapt other driving conditions of the ATV 9. For example, the ECU 200 may cause the brake control unit 124 to disable the ABS when the front differential 76 is in the engaged and locked state. The ECU 200 may implement an engine speed limiting function and control the engine 16 to limit a speed of the engine 16 when the front differential 76 is in the engaged and locked state. The driver may increase an engine speed limit enforced by the engine speed limiting function by depressing the override button 186. Successively depressing the override button 186 may lead to successive increases of the engine speed limit. Instead of the override button 186, use of another equivalent manual override control is also contemplated. The ECU 200 may also implement a vehicle speed limiting function and control the engine 16 to limit a speed of the ATV 9 when the front differential 76 is in the engaged and locked state, unless the override button 186 has been depressed by the driver to disable the vehicle speed limiting function.

Figure 10A:
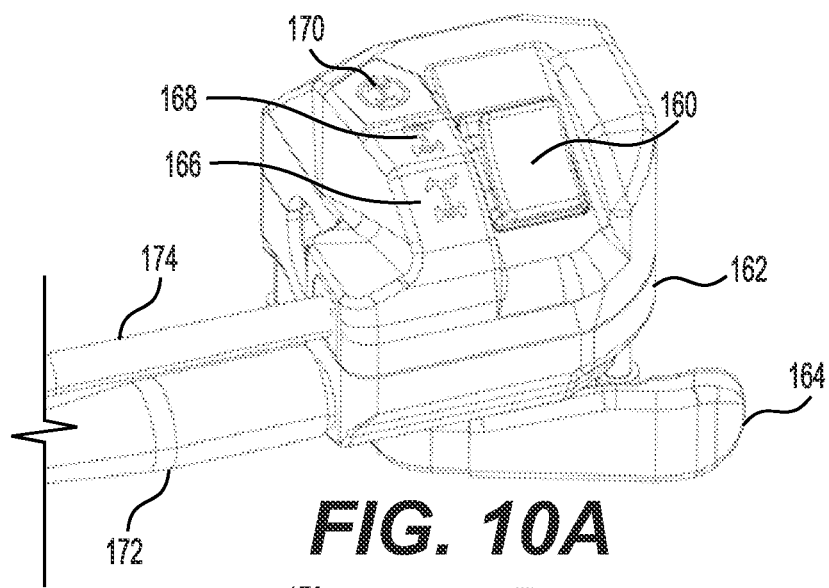
FIGS. 10a, 10b and 10c are detailed rear perspective views of the right switch control housing of FIG. 9 showing a differential lock switch in first, second and third positions, respectively.
Figure 10B:
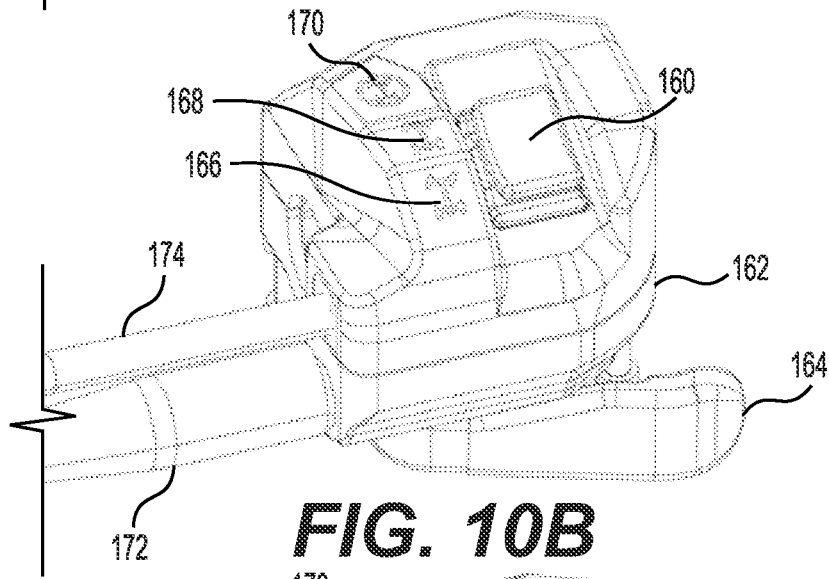
Figure 10C:
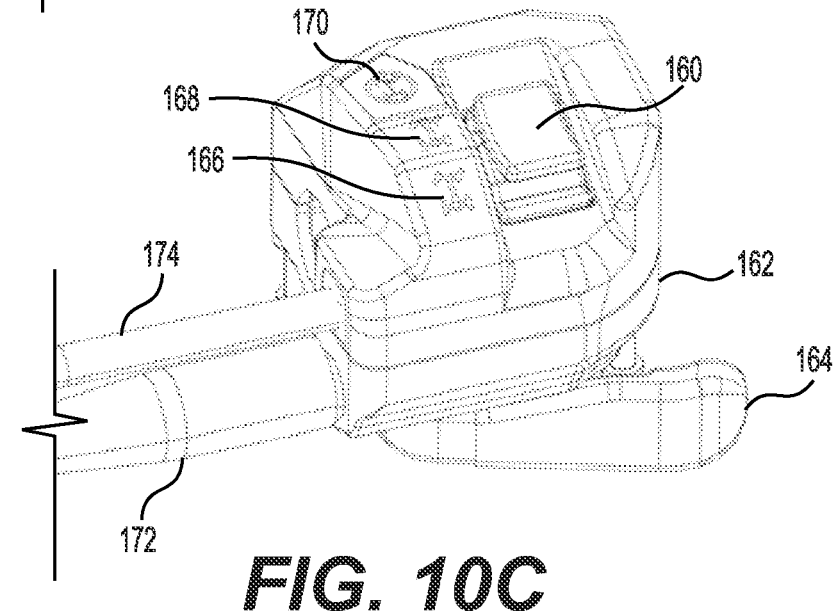

The ECU 200 provides feedback signals 234 to the right switch control housing 162 about the current status of the front differential 76, allowing the icons 166, 168 and 170 shown on FIGS. 10a, 10b and 10c to provide visual feedback to the driver about a current operating mode of the front differential 76. The icon 166 is lit when the front differential 76 is disengaged, the ATV 9 being operated in rear-wheel drive mode. The icon 168 is lit when the front differential 76 is engaged and not locked, the ATV 9 being operated in all-wheel drive mode. When the front differential 76 is engaged and locked, the icon 170 is lit. The icon 170 may flash on and off when the driver has requested locking the front differential 76 while other conditions of the ATV 9, described hereinabove, prevent or delay locking of the front differential 76. The ECU 200 controls lighting of the icons 166, 168 and 170 according to the current status of the front differential 76. Instead of or in addition to the visual display provided by the icons 166, 168 and 170, the ECU 200 may cause the cluster 214 to display one or more icons providing the same or equivalent information.

Figure 13:
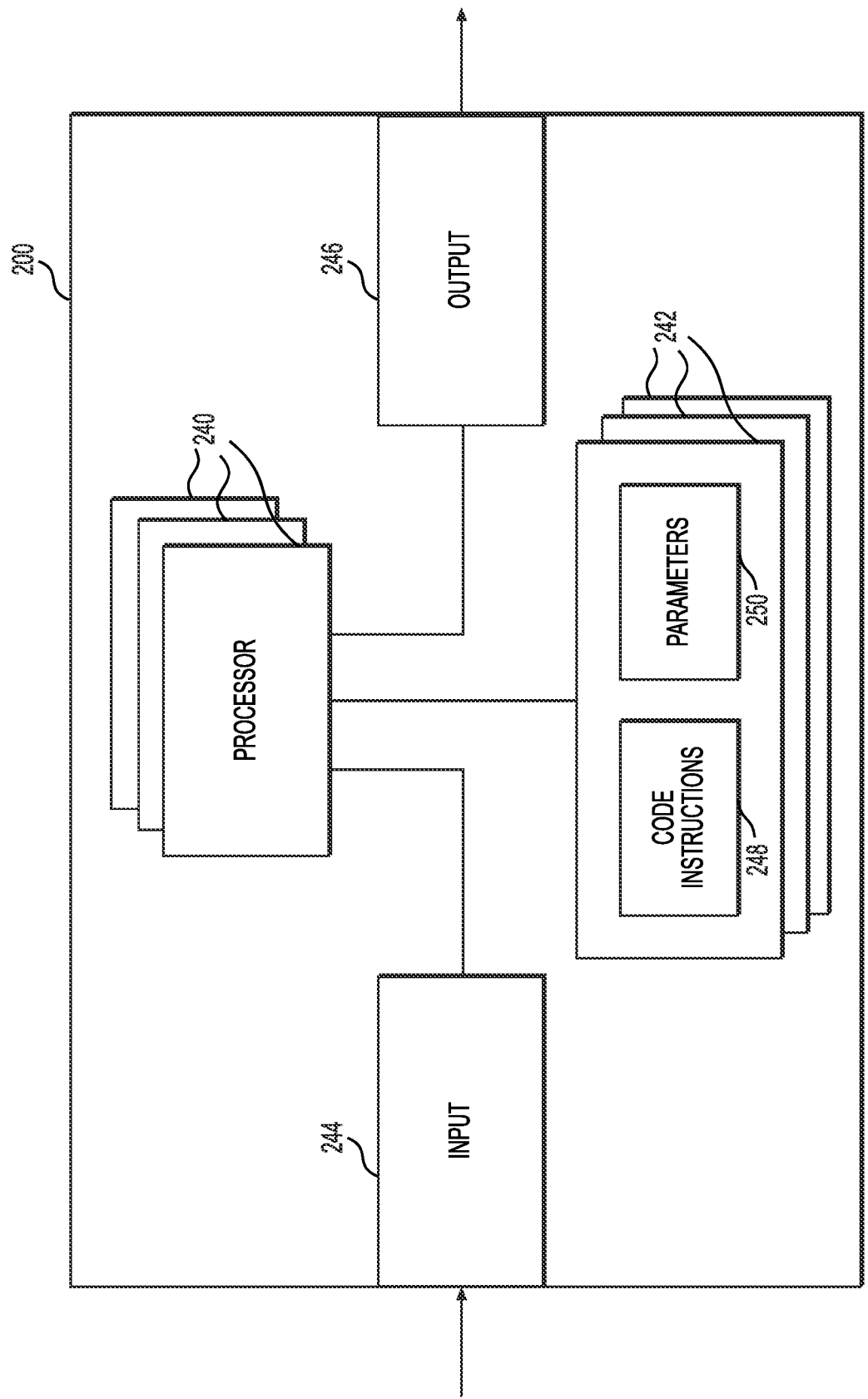
FIG. 13 is a block diagram showing internal components of a controller of FIG. 12 according to an embodiment.

As shown on FIG. 13, the ECU 200 comprises a processor 240 (or a plurality of cooperating processors 240) operatively connected to a memory device 242 (or a plurality of cooperating memory devices 242), to an input device 244 and to an output device 246 allowing the ECU 200 to communicate with the other components of the ATV 9 shown on FIG. 12. Although one input device 244 and one output device 246 are shown, the ECU 200 may comprise a plurality or input and output devices, or one or more input/output devices adapted for communicating with other components of the ATV 9. The memory device 242 contains a non-transient memory 248 storing computer instructions that, when executed by the processor 240, allow the ECU 200 to control locking and unlocking of the front differential 76. The memory device 240 may also store a table 250 including various parameters, for example the predetermined time for the third position of the differential lock switch 160, the predetermined opening threshold for the throttle, the predetermined state of the CVT 17, and the predetermined steering angle threshold for the steering assembly 30.

The ATV 9 includes other components such as an air intake system, an exhaust system, radiators, a gas tank, a battery, a starter, and the like. As it is believed that these components would be readily recognized by one of ordinary skill in the art, further explanation and description of these components will not be provided herein.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A controllable differential system for a vehicle, comprising:
    a differential having:
        a disengaged mode, and
        an engaged mode,
        the differential being selectively lockable while in the engaged mode;
    a differential lock switch having:
        a first position,
        a second position, and
        a third position,
        the second position being intermediate the first and third positions, the differential lock switch being biased to return to the second position when released from the third position,
        the differential lock switch being operatively connected to the differential for causing the differential to be:
            in the disengaged mode when the differential lock switch is in the first position, and
            in the engaged mode when the differential lock switch is in the second position; and
    a controller operatively connected to the differential and to the differential lock switch, the controller being adapted for controlling the differential to:
        selectively change the differential from one of an unlocked state and a locked state to another one of the unlocked state and the locked state when the differential lock switch is placed in the third position.

2. The controllable differential system of claim 1, wherein the controller is further adapted for controlling the differential to change from the one of the unlocked state and the locked state to the other one of the unlocked state and the locked state while the differential lock switch is being held in the third position for more than a predetermined time.

3. The controllable differential system of claim 1, wherein the controller is further adapted for controlling the differential to change from the one of the unlocked state and the locked state to the other one of the unlocked state and the locked state when the differential lock switch is released from the third position after being held for more than a predetermined time.

4. The controllable differential system of claim 1, further comprising:
    an actuator electrically connected to the differential lock switch and adapted to receive therefrom commands to engage and disengage the differential, the actuator being further electrically connected to the controller and adapted for receiving therefrom commands to lock and unlock the differential; and
    a mechanical lock adapted for being driven by the actuator to selectively engage and disengage the differential and to selectively lock and unlock the differential.

5. The controllable differential system of claim 4, wherein:
    the actuator comprises an electric motor driven by an integrated circuit; and
    the mechanical lock comprises a rod driven by the electric motor and a lever driven by the rod, the lever being adapted to engage a sleeve in the differential to selectively disengage, engage or engage and lock the differential.

6. The controllable differential system of claim 4, wherein the actuator is adapted for providing an electronic feedback signal of the locked or unlocked state to the controller.

7. The controllable differential system of claim 1, wherein the differential is a front differential adapted for being mounted in a front drivetrain of the vehicle.

8. A vehicle, comprising:
    a frame;
    a motor connected to the frame;

a rear drivetrain connected to the frame;
a front drivetrain connected to the frame, the front drivetrain comprising a front differential selectably configurable in one of (i) a disengaged mode for rear-wheel drive operation of the vehicle, (ii) an engaged and unlocked mode, and (iii) an engaged and locked mode, the vehicle being operable in all-wheel drive when the front differential is engaged;
a transmission adapted for:
  directing power from the motor to the rear drivetrain, and
  when the front differential is engaged, directing power from the motor to the front drivetrain;
a controller operatively connected to the front differential; and
a differential lock switch operatively connected to the front differential and to the controller, the differential lock switch being adapted for:
  providing a disengaging command to the front differential for placing the front differential in the disengaged mode,
  providing an engaging command to the front differential for placing the front differential in the engaged and unlocked mode,
  providing a locking command to the controller, the controller selectively causing the front differential to change from the engaged and unlocked mode to the engaged and locked mode when receiving the locking command, and
  providing an unlocking command to the controller, the controller causing the front differential to change from the engaged and locked mode to the engaged and unlocked mode when receiving the unlocking command,
the differential lock switch having:
  a first position,
  a second position, and
  a third position,
the second position being intermediate the first and third positions, the differential lock switch being biased to return to the second position when released from the third position; and
the differential lock switch being adapted for:
  providing the disengaging command when in the first position,
  providing the engaging command when moving from the first position to the second position,
  providing the locking command when placed in the third position while the front differential is in the engaged and unlocked mode, and
  providing the unlocking command when placed in the third position while the front differential is in the engaged and locked mode.

9. The vehicle of claim 8, further comprising an actuator operatively connected to the front differential and controlled by the controller, the actuator being adapted for:
  receiving the disengaging command from the differential lock switch;
  receiving the engaging command from the differential lock switch;
  receiving the locking command via the controller;
  receiving the unlocking command via the controller; and
  in response to receiving one of the disengaging command, the engaging command, the locking command and the unlocking command, selectively placing the front differential in a corresponding one of the disengaged mode, the engaged and unlocked mode and the engaged and locked mode.

10. The vehicle of claim 8, wherein the locking command and the locking command are provided by the differential lock switch when the differential lock switch is held in the third position for more than a predetermined time.

11. The vehicle of claim 8, further comprising:
  a brake control unit implementing an anti-lock braking system (ABS);
  wherein the controller is further adapted for causing the brake control unit to disable the ABS when the front differential is in the engaged and locked mode.

12. The vehicle claim 8, further comprising:
  a manual override control;
  wherein the controller is further adapted for controlling the motor to limit a speed of the vehicle when the front differential is in the engaged and locked mode and the manual override control is not activated.

13. The vehicle of claim 8, further comprising:
  a steering assembly operatively connected to the front drivetrain; and
  a steering angle sensor operatively connected to the steering assembly;
  wherein the controller is further operatively connected to the steering angle sensor and is further adapted for delaying or preventing changing the front differential from the engaged and unlocked mode to the engaged and locked mode when a steering angle indicated by the steering angle sensor exceeds a predetermined angle threshold.

14. The vehicle of claim 8, further comprising:
  a vehicle speed sensor operatively connected to one of the front and rear drivetrains;
  wherein the controller is further operatively connected to the vehicle speed sensor and is further adapted for delaying or preventing changing the front differential from the engaged and unlocked mode to the engaged and locked mode when a vehicle speed indicated by the vehicle speed sensor exceeds a predetermined angle threshold.

15. The vehicle of claim 8, further comprising:
  an engine speed sensor operatively connected to the motor;
  wherein the controller is further operatively connected to the engine speed sensor and is further adapted for delaying or preventing changing the front differential from the engaged and unlocked mode to the engaged and locked mode when a speed of the motor indicated by the engine speed sensor exceeds a predetermined angle threshold.

16. The vehicle of claim 8, further comprising:
  a gearbox sensor operatively connected to the transmission;
  wherein the controller is further operatively connected to the gearbox sensor and is further adapted for delaying or preventing changing the front differential from the engaged and unlocked mode to the engaged and locked mode when the gearbox sensor indicates that the transmission is not in a predetermined state.

17. The vehicle of claim 8, further comprising:
  a throttle operator operatively connected to a throttle and to the motor;
  a throttle opening sensor;
  wherein the controller is further operatively connected to the throttle opening sensor and is further adapted for delaying or preventing changing the front differential from the engaged and unlocked mode to the engaged and locked mode when an opening of the throttle reported by the throttle opening sensor exceeds a predetermined opening threshold.

18. The vehicle of claim 8 further comprising:
a controller area network (CAN) bus operatively connected to the controller;
an indicator of a status of the CAN bus;
wherein the controller is further operatively connected to the CAN bus status indicator and is further adapted for delaying or preventing changing the front differential from the engaged and unlocked mode to the engaged and locked mode when the status of the CAN bus reported by the CAN bus status indicator indicates a loss of signal integrity.

19. The vehicle of claim 8, further comprising a visual display operatively connected to the controller, the controller being further adapted for:
causing the visual display to display an indication when the front differential is prevented from changing from the engaged and unlocked mode to the engaged and locked mode; and
causing the visual display to display an indication when changing from the engaged and unlocked mode to the engaged and locked mode is delayed.

* * * * *

UNITED STATES PATENT AND TRADEMARK OFFICE
CERTIFICATE OF CORRECTION

| | |
|---|---|
| PATENT NO. | : 11,958,353 B2 |
| APPLICATION NO. | : 17/772764 |
| DATED | : April 16, 2024 |
| INVENTOR(S) | : Walid Ben Attouch et al. |

It is certified that error appears in the above-identified patent and that said Letters Patent is hereby corrected as shown below:

In the Claims

In Column 18, Line 5, Claim 10, "the locking command" should read --the unlocking command--

In Column 18, Line 14, Claim 12, "The vehicle claim 8," should read --The vehicle of claim 8,--

Signed and Sealed this
Thirteenth Day of August, 2024

Katherine Kelly Vidal
*Director of the United States Patent and Trademark Office*